United States Patent
Inoue et al.

(10) Patent No.: US 7,612,850 B2
(45) Date of Patent: Nov. 3, 2009

(54) SEMI-TRANSMISSIVE/SEMI-REFLECTIVE ELECTRODE SUBSTRATE, METHOD FOR MANUFACTURING SAME, AND LIQUID CRYSTAL DISPLAY USING SUCH SEMI-TRANSMISSIVE/SEMI-REFLECTIVE ELECTRODE SUBSTRATE

(76) Inventors: Kazuyoshi Inoue, c/o Central Research Laboratories, Idemitsu Kosan Co., Ltd., 1280, Kami-Izumi Sodeguara, Chiba (JP) 299-0205; Shigekazu Tomai, c/o Central Research Laboratories, Idemitsu Kosan Co., Ltd., 1280, Kami-Izumi Sodeguara, Chiba (JP) 299-0205; Masato Matsubara, c/o Central Research Laboratories, Idemitsu Kosan Co., Ltd., 1280, Kami-Izumi Sodeguara, Chiba (JP) 299-0205

( * ) Notice: Subject to any disclaimer, the term of this patent is extended or adjusted under 35 U.S.C. 154(b) by 294 days.

(21) Appl. No.: 10/591,529

(22) PCT Filed: Feb. 18, 2005

(86) PCT No.: PCT/JP2005/002602

§ 371 (c)(1),
(2), (4) Date: Sep. 1, 2006

(87) PCT Pub. No.: WO2005/086179

PCT Pub. Date: Sep. 15, 2005

(65) Prior Publication Data

US 2008/0239217 A1    Oct. 2, 2008

(30) Foreign Application Priority Data

Mar. 5, 2004  (JP) ............................. 2004-061656
Mar. 5, 2004  (JP) ............................. 2004-062480

(51) Int. Cl.
*G02F 1/1335* (2006.01)
(52) U.S. Cl. ...................................................... 349/114
(58) Field of Classification Search .................. None
See application file for complete search history.

(56) References Cited

U.S. PATENT DOCUMENTS 6,600,470 B1 *  7/2003  Tsuda ........................ 345/89

(Continued)

FOREIGN PATENT DOCUMENTS

CN           1447156         10/2003

(Continued)

*Primary Examiner*—Sung H Pak

(57) ABSTRACT

Provided are a semi-transmitting and semi-reflecting electrode substrate provided with a transparent conductive layer which is almost free from the generation of residues caused by etching and is resistant to an etchant for a metal reflecting layer (metal layer), a method of producing the semi-transmitting and semi-reflecting electrode substrate and a liquid crystal display device using the semi-transmitting and semi-reflecting electrode substrate. Specifically, the invention relates a semi-transmitting and semi-reflecting electrode substrate comprising a transparent substrate, a transparent conductive layer which is disposed on the transparent substrate and contains indium oxide as its major component and further one or two or more oxides selected from tungsten oxide, molybdenum oxide and niobium oxide and a metal reflecting layer which is disposed on the transparent substrate, reflects extraneous light and is connected with the transparent conductive layer, to a method producing the semi-transmitting and semi-reflecting electrode substrate and to a liquid crystal display device using the semi-transmitting and semi-reflecting electrode substrate. This semi-transmitting and semi-reflecting electrode substrate is almost free from the generation of residues, has high processability and improves the yield.

17 Claims, 1 Drawing Sheet

U.S. PATENT DOCUMENTS

| | | |
|---|---|---|
| 6,879,361 B2 | 4/2005 | Moon |
| 6,919,944 B2 | 7/2005 | Maeda |
| 7,236,220 B2 * | 6/2007 | Kim et al. ............ 349/106 |
| 7,304,780 B2 * | 12/2007 | Liu et al. ............. 359/245 |
| 2001/0008437 A1 | 7/2001 | Fujimori et al. |
| 2003/0209726 A1 | 11/2003 | Shigeno |
| 2004/0013899 A1 | 1/2004 | Abe |
| 2004/0109111 A1 | 6/2004 | Ino |
| 2004/0169799 A1 | 9/2004 | Hanakawa et al. |
| 2006/0234088 A1 | 10/2006 | Inoue |

FOREIGN PATENT DOCUMENTS

| | | |
|---|---|---|
| CN | 1461819 | 12/2003 |
| JP | 2001-272674 | 10/2001 |
| JP | 2001-272674 A | 10/2001 |
| JP | 2001-305529 A2 | 10/2001 |
| JP | 2002-049033 A2 | 2/2002 |
| JP | 2002-049034 A2 | 2/2002 |
| JP | 2003-029257 A | 1/2003 |
| JP | 2003-029257 A2 | 1/2003 |
| JP | 2003-029298 A | 1/2003 |
| JP | 2003-029298 A2 | 1/2003 |
| JP | 2003-084300 A | 3/2003 |
| JP | 2003-084300 A2 | 4/2003 |
| JP | 2003-107453 A | 4/2003 |
| JP | 2003-107453 A2 | 4/2003 |
| WO | WO 03/054621 A1 | 7/2003 |
| WO | WO 2004/013372 | 2/2004 |

* cited by examiner

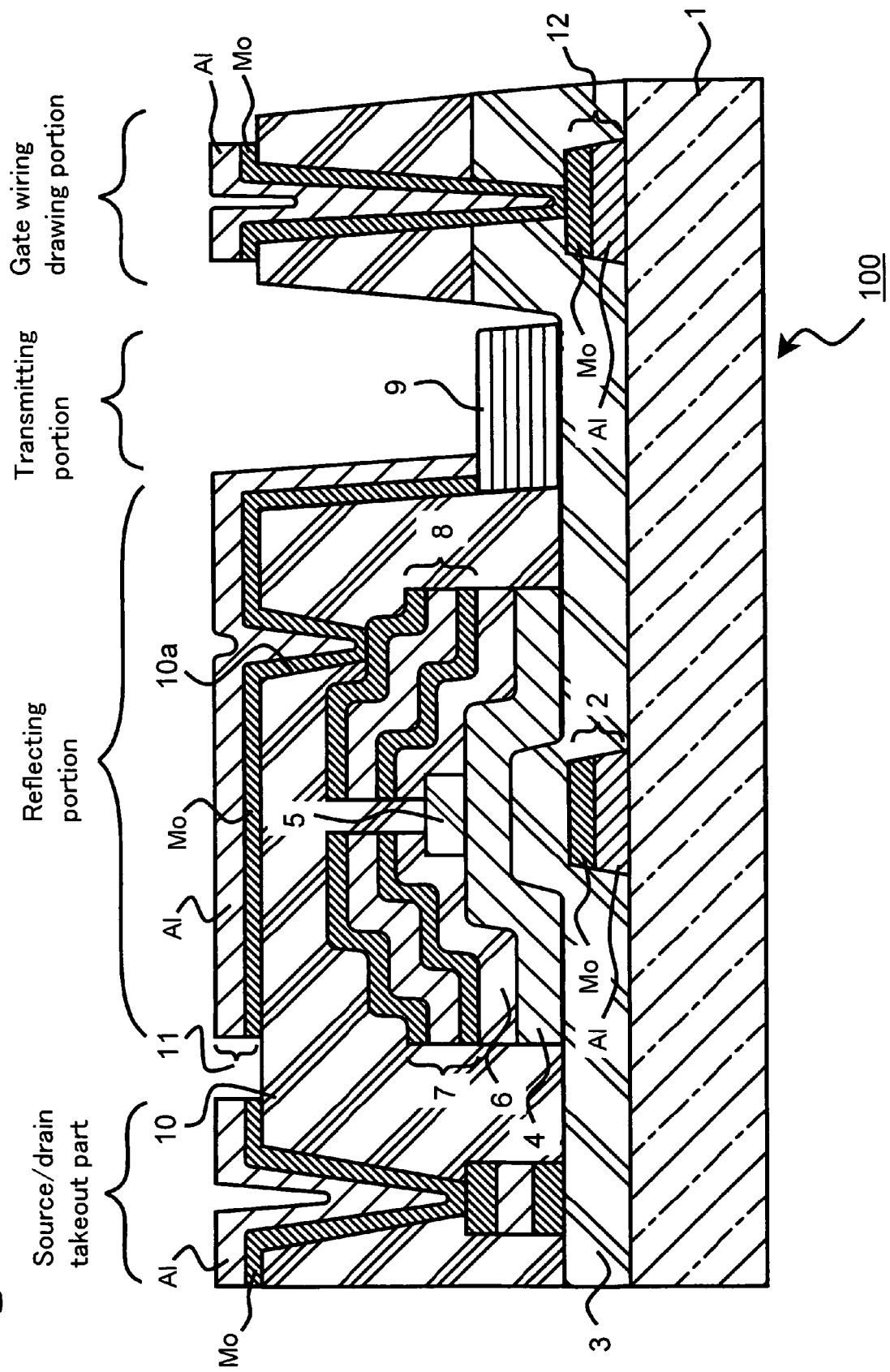

SEMI-TRANSMISSIVE/SEMI-REFLECTIVE ELECTRODE SUBSTRATE, METHOD FOR MANUFACTURING SAME, AND LIQUID CRYSTAL DISPLAY USING SUCH SEMI-TRANSMISSIVE/SEMI-REFLECTIVE ELECTRODE SUBSTRATE

FIELD OF THE INVENTION

The invention relates to a semi-transmitting and semi-reflecting substrate used in a semi-transmitting and semi-reflecting type liquid crystal display. Also, this invention relates to a method of producing the semi-transmitting and semi-reflecting electrode substrate and to a liquid crystal display device using the produced semi-transmitting and semi-reflector electrode substrate.

BACKGROUND ART

A semi-transmitting and semi-reflecting liquid crystal device is a liquid crystal display device provided with both reflector electrode and transparent electrode. This device therefore has a function as a transmitting type liquid crystal display device and a function as a reflecting type liquid crystal device at the same time. Conventionally, earnest researches and developments of this semi-transmitting and semi-reflecting liquid crystal display device have been made from, for example, the following reasons.

(1) The liquid crystal display device is a semi-transmitting and semi-reflecting type. Therefore, it may be used as a reflecting type allowing a liquid crystal display device to be effected by utilizing extraneous light in the open where extraneous light is relatively strong whereas it may be used as a transmitting type allowing a liquid crystal display to be effected by utilizing back light in the interior of a house where extraneous light is relatively weak. Therefore, this display device can display with high brightness whether the display is used in the open or in the interior of a house.

(2) When the liquid crystal display is used in a bright place (under strong extraneous light), it can be used as reflecting type and power consumption can be therefore saved.

(3) The liquid crystal display can be used as a reflecting type in the open and therefore, it can be operated with small power consumption. It is therefore suitable for portable type displays.

(4) A full-color type semi-transmitting and semi-reflecting display device can be easily developed.

However, in the semi-transmitting and semi-reflecting liquid crystal display, a reflector electrode and a transparent electrode must be disposed in the same pixel in a liquid crystal driving electrode portion, giving rise to the problem that the production process is complicated, and a reduction in yield and cost-up are caused and the problem that an image seen on a transmitting type liquid crystal display is different from that on a reflecting type and there is therefore a difficulty in seeing an image.

In light of this, the following Patent References 1 and 2 disclose semi-transmitting and semi-reflecting liquid crystal driving electrodes respectively having a structure in which a silver reflecting film is formed, then this silver reflecting film is covered with a protective film and a liquid crystal driving transparent electrode is formed on the protective film. These silver reflecting layer and liquid crystal driving transparent electrode are alternately arranged to thereby form a semi-transmitting and semi-reflecting liquid crystal driving electrode having a semi-transmitting and semi-reflecting function.

Also, the following Patent Reference 3 discloses a semi-transmitting reflecting film produced by further forming a Si thin film having an auxiliary reflecting function beneath a metal-based semi-transmitting reflecting layer.

Patent Reference 1: Publication of Japanese Patent Application Laid-Open (JP-A) No. 2002-49034
Patent Reference 2: Publication of JP-A No. 2002-49033
Patent Reference 3: Publication of JP-A No. 2001-305529

DISCLOSURE OF THE INVENTION

Problems to be solved by the Invention

However, in the above Patent references 1 to 3 and the like, the transparent electrode portion is etched separately from the reflector portion. This is the reason why it is necessary to carry out the repeated step "film formation-etching by photolithography-film formation-etching by photolithography" to form a layer which is to be the transparent electrode portion and a layer which is to be a reflector portion. At this time, the layer which is to be the transparent electrode portion and the layer which is to be a reflector portion are electrically connected with each other and there is therefore the case where a developer, an etchant and a releasing agent, which are used to etch these electrode layers, cause a cell reaction which causes the reflecting substrate (reflector portion) to be corroded locally.

Also, when a reflector electrode is provided on a transparent electrode, there is a fear of damaging the transparent electrode when the reflector electrode is etched. In particular, ITO (indium-tin oxide) is given as general examples of the material to be used for the transparent electrode and Al is given as examples of the material to be used for the reflector electrode. In this case, there is the problem that a cell reaction is easily caused when ITO is in contact with Al.

Also, in the case of crystalline ITO, it can be etched only by a strong acid such as aqua regia or hydrochloric acid, posing the problem, for example, that wiring materials such as TFT are corroded. In the case of amorphous ITO, on the other hand, a reduction in adhesion to a base substrate is often observed and there is also the case where it causes an increase in contact resistance between ITO and TFT wiring materials. Also, a residue is generated during etching and there is therefore a fear that short circuits are developed and troubles about the driving of a liquid crystal arise. On the other hand, IZO (trademark, manufactured by Idemitsu Kosan Co., Ltd., indium-zinc oxide) has been developed as an amorphous material. However, when a reflector electrode containing Al is provided on a transparent electrode, this material is dissolved even in an etchant for Al by nature it is difficult to use this material.

The invention has been made in view of the above problems and it is an object of the invention to provide a semi-transmitting and semi-reflecting electrode substrate which produces almost no residue in etching and is resistant to an etchant used for a reflector electrode. Another object of the invention is to provide a production method to obtain the above semi-transmitting and semi-reflecting electrode substrate in an efficient manner.

Also, a further object of the invention is to provide a liquid crystal display device utilizing the above semi-transmitting and semi-reflecting electrode substrate.

Means to Solve the Problem

The invention is largely divided into two classes. The following (1) to (9) are a first invention group. The following (10) to (21) are a second invention group.

Embodiments of the first invention are those of the A-group which will be explained later and embodiments of the second invention are those of the B-group which will be explained later.

First Invention Group (1) In order to solve the above problem, a semi-transmitting and semi-reflecting electrode substrate comprises a transparent substrate, a transparent conductive layer which is disposed on the above transparent substrate and contains indium oxide as its major component and further one or two or more oxides selected from tungsten oxide, molybdenum oxide and niobium oxide and a metal reflecting layer which is disposed on the above transparent substrate, reflects extraneous light and is connected electrically with the above transparent conductive layer.

The descriptions which read as follows: "contains indium oxide as its major component" in this patent means that indium oxide is contained as its principal component and means that the content of indium oxide is 50% or more in terms of atomic composition ratio, weight ratio or volumetric ratio.

The addition of tungsten oxide, molybdenum oxide or niobium oxide ensures that after the transparent conductive layer is formed, the formed transparent conductive layer can be etched using an etchant containing oxalic acid. The substrate temperature when the film is formed is preferably R.T. (room temperature) to 200° C. and more preferably 80° C. to 180° C. The reason why the substrate temperature when the film is formed is designed to be in the above range is that it is necessary to cool for controlling the substrate temperature to R.T. or less, leading to a loss of energy, whereas when the substrate temperature is designed to be 200° C. or higher, there is the case where the etching using the etchant containing oxalic acid cannot be carried out because of, for example, crystallization of the transparent conductive layer. Also, water and hydrogen may be added in the atmospheric gas during the course of film formation. This makes it easy to etch the formed transparent conductive layer by using an etchant containing oxalic acid and residues can be more reduced.

The addition of the above metal oxide enables the crystallization of the transparent conductive layer on the substrate simply by heating the temperature of the substrate to 200° C. or higher after the above formed transparent conductive layer is etched. The crystallization temperature is preferably 220° C. or higher and more preferably 230° C. or higher.

If the transparent conductive layer is crystallized, the damages to the transparent conductive layer caused by an etchant constituted of phosphoric acid, acetic acid and nitric acid, which etchant is usually used for a metal reflecting layer can be avoided. Also, the addition of tungsten oxide, molybdenum oxide or niobium oxide makes it possible to suppress a cell reaction.

The film thickness of the transparent conductive layer is preferably 20 to 500 nm, more preferably 30 to 300 nm and still more preferably 30 to 200 nm. When the film thickness of the transparent conductive layer is less than 20 nm, there is the case where the surface resistance of the transparent conductive layer is raised whereas if the film thickness of the transparent conductive layer exceeds 500 nm, there is the case where the problems arise concerning a reduction in transmittance and processing accuracy.

The reflectance of the metal reflecting layer is preferably 80% or more. The reflectance according to the invention is measured using a graph in which the ordinate (Y axis) is the reflectance and the abscissa (X axis) is the wavelength. This reflectance is defined as a value obtained by expressing the proportion of the area calculated by actual data of the metal reflecting layer (or metal layer) as % based on the area obtained when the reflectance at each wavelength is set to 100% in a measurable wavelength range of 400 to 700 nm in the graph.

Here, the aforementioned area means the area enclosed by the X axis and the reflectance spectrums in the wavelength range of 400 to 700 nm in the above graph. It is needless to say that this area is equal to the value obtained by integrating the reflectance spectrum with respect to the wavelength of 400 to 700 nm.

The film thickness of the metal reflecting layer is preferably 10 to 1000 nm, more preferably 30 to 300 nm and still more preferably 50 to 200 nm. When the film thickness of the metal reflecting layer is less than 10 nm, there is the case where the reflectance is 80% or more, whereas the film thickness exceeds 1000 nm, there is the case where a problem arises concerning processing accuracy.

Also, the transparent conductive layer is provided with the ability of almost transmitting light, whereas the metal reflecting layer has the ability of almost reflecting light. When the transparent conductive layer having such a function and the above metal reflecting layer connected electrically with the transparent conductive layer are provided at the same time, a semi-transmitting and semi-reflecting electrode substrate is obtained.

(2) Also, the invention relates to a semi-transmitting and semi-reflecting electrode substrate according to the above (1), wherein the value of [In]/[All metals] that is a composition ratio of In in the above transparent conductive layer containing indium oxide as its major component and further one or two or more oxides selected from tungsten oxide, molybdenum oxide and niobium oxide is 0.85 to 0.99.

As to the composition of the transparent conductive layer, the composition ratio of In (hereinafter, referred to as atomic ratio in some cases) is as follows: [In]/[All metals]=0.85 to 0.99 as atomic ratio. When the composition ratio of In is less than 0.85, there is the case where the resistance of the transparent conductive layer is increased and the transparent conductive layer is not crystallized even if the substrate on which the transparent conductive layer has been formed is heated to 200° C. or higher. Also, when the composition ratio of In exceeds 0.99, there is the case where the transparent conductive layer is crystallized when the transparent conductive layer is formed and cannot be etched by an etchant containing oxalic acid and residues are generated in a large amount. This is the reason why the composition ratio [In]/[All metals] =0.85 to 0.99. Here, [In] represents the number of indium atoms per unit volume and [All metals] represents the number of all metal atoms per unit volume in the transparent conductive layer.

Sn and Zn may be added as third atoms in the above transparent conductive layer. Here, the first atom is an indium atom in indium oxide and the second atom is a tungsten atom, niobium atom and molybdenum oxide atom in one or two or more oxides selected from tungsten oxide, niobium oxide and molybdenum oxide. "Third atom" means an atom following these first and second atoms and means, in short, other atom.

When Sn is added, the composition ratio of Sn, namely, [Sn]/[All metals]<0.2 and more preferably [Sn]/[All metals] <0.1 as atomic ratio. When [Sn]/[All metals] in the transparent conductive layer is 0.2 or more, there is the case where residues are generated during etching. Here, [Sn] represents the number of tin atoms per unit volume.

When Zn is added, the composition ratio of Zn, namely, [Zn]/[All metals]<0.1 and more preferably [Zn]/[All metals] <0.05 as atomic ratio. When [Zn]/[All metals] in the transparent conductive layer is 0.1 or more, there is the case where a mixture acid containing phosphoric acid, acetic acid and nitric acid gives damages to the transparent conductive layer when the metal reflecting layer is etched using the mixture acid. Here, [Zn] represents the number of zinc atoms per unit volume.

(3) Also, the invention relates to a semi-transmitting and semi-reflecting electrode substrate according to the above (1) or (2), wherein the above metal reflecting layer has a layer containing Al or Ag as components.

Besides Al and Ag, lanthanoid-based metals such as Nd and heavy metals such as Co, Ni, Pd, Au, Zr, Pt and Cu may be added in the layer (layer containing Al or Ag as its major components) included in the above metal reflecting layer.

The content of these lanthanoid-based metals and heavy metals to be added is preferably 0.1 to 5 wt %, more preferably 0.5 to 3 wt % and still more preferably 0.5 to 2 wt %. When the content of the lanthanoid metals and heavy metals is less than 0.1 wt %, there is the case where no effect is obtained by the addition of the these metals whereas when the content of the lanthanoid metals and heavy metals is 5 wt % or more, there is the case where the reflectance of the metal reflecting layer is reduced.

(4) A semi-transmitting and semi-reflecting electrode substrate according to the invention comprises a transparent substrate, a transparent conductive layer which is disposed on the above transparent substrate and contains indium oxide as its major component and further one or two or more oxides selected from tungsten oxide, molybdenum oxide and niobium oxide, a TFT element disposed on the above transparent substrate and a metal layer which is disposed on the above transparent substrate and connects the above transparent conductive layer electrically with the above TFT element, wherein the above metal layer has a reflectance of 80% or more.

The above TFT element is a Thin Film Transistor (thin film transistor). When tungsten oxide, molybdenum oxide or niobium oxide is added, it is ensured that after the transparent conductive layer is formed, the formed transparent conductive layer can be etched using an etchant containing oxalic acid. The substrate temperature when the film is formed is preferably R.T. (room temperature) to 200° C. and more preferably 80° C. to 180° C. The reason why the substrate temperature when the film is formed is designed to be in the above range is that it is necessary to cool for controlling the substrate temperature to R.T. or less, leading to a loss of energy, whereas when the substrate temperature is designed to be 200° C. or higher, there is the case where the etching using the etchant containing oxalic acid cannot be carried out because of, for example, crystallization of the transparent conductive layer. Also, water and hydrogen may be added in the atmospheric gas during the course of film formation. This makes it easy to etch the formed transparent conductive layer by using an etchant containing oxalic acid and residues can be more reduced.

The addition of the above metal oxide enables the crystallization of the transparent conductive layer on the substrate simply by heating the temperature of the substrate to 200° C. after the above formed transparent conductive layer is etched. The crystallization temperature is preferably 220° C. or higher and more preferably 230° C. or higher. If the transparent conductive layer is crystallized, the damages to the transparent conductive layer caused by an etchant constituted of phosphoric acid, acetic acid and nitric acid, which etchant is usually used for a metal reflecting layer can be avoided.

The film thickness of the transparent conductive layer is preferably 20 to 500 mm, more preferably 30 to 300 nm and still more preferably 30 to 200 nm. When the film thickness of the transparent conductive layer is less than 20 nm, there is the case where the surface resistance of the transparent conductive layer is raised whereas when the film thickness of the transparent conductive layer exceeds 500 nm, there is the case where the problems arise concerning a reduction in transmittance and processing accuracy. The film thickness of the metal reflecting layer is preferably 10 to 1000 nm, more preferably 30 to 300 nm and still more preferably 50 to 200 nm. When the film thickness of the metal reflecting layer is less than 10 nm, there is the case where the reflectance is not 80% or more, whereas the film thickness exceeds 1000 nm, there is the case where a problem arises concerning processing accuracy.

Also, the transparent conductive layer is provided with the ability of almost transmitting light, whereas the metal layer has the ability of almost reflecting light. When the transparent conductive layer is electrically connected with the TFT element through the metal layer, the transparent conductive layer and the metal layer function as the electrodes to be used in a liquid crystal display device. Also, because the reflectance of the metal layer is 80% or more, the metal layer functions as a reflector electrode resultantly. The metal layer that functions as a reflector electrode and the transparent conductive layer are provided at the same time in this manner to obtain a semi-transmitting and semi-reflecting electrode substrate is obtained.

(5) Also, the invention relates to a semi-transmitting and semi-reflecting electrode substrate according to the above (4), wherein the value of [In]/[All metals] that is a composition ratio of In in the above transparent conductive layer containing indium oxide as its major component and further one or two or more oxides selected from tungsten oxide, molybdenum oxide and niobium oxide is 0.85 to 0.99.

As to the composition of the transparent conductive layer, the composition ratio of In is as follows: [In]/[All metals] =0.85 to 0.99 as atomic ratio. When the composition ratio of In is less than 0.85, there is the case where the resistance of the transparent conductive layer is increased and the transparent conductive layer is not crystallized even if the substrate on which the transparent conductive layer has been formed is heated to 200° C. or higher. Also, when the composition ratio of In exceeds 0.99, there is the case where the transparent conductive layer is not crystallized when the transparent conductive layer is formed and cannot be etched by an etchant containing oxalic acid and residues are generated in a large amount. This is the reason why the composition ratio [In]/[All metals]=0.85 to 0.99.

Sn and Zn may be added as third atoms in the above transparent conductive layer. When Sn is added, the composition ratio of Sn, namely, [Sn]/[All metals]<0.2 and more preferably [Sn]/[All metals]<0.1 as atomic ratio. When [Sn]/[All metals] in the transparent conductive layer is 0.2 or more, there is the case where residues are generated during etching.

When Zn is added, the composition ratio of Zn, namely, [Zn]/[All metals]<0.1 and more preferably [Zn]/[All metals] <0.05 as atomic ratio. When [Zn]/[All metals] in the transparent conductive layer is 0.1 or more, there is the case where a mixture acid containing phosphoric acid, acetic acid and nitric acid gives damages to the transparent conductive layer when the metal reflecting layer is etched using the mixture acid.

(6) Also, the invention relates to a semi-transmitting and semi-reflecting electrode substrate according to the above (4) or (5), wherein the above metal layer has a layer containing Al or Ag as components.

If the reflectance of the metal layer is not 80% or more, the reflectance for extraneous light is decreased and there is therefore the case where an image on a liquid crystal display is scarcely seen. As the layer (layer containing Al and Ag as its components) included in the metal layer, besides Al and Ag, lanthanoid-based metals such as Nd and heavy metals such as Co, Ni, Pd, Au, Zr, Pt and Cu are preferably added.

The content of these lanthanoid-based metals and heavy metals to be added is preferably 0.1 to 5 wt %, more preferably 0.5 to 3 wt % and still more preferably 0.5 to 2 wt %. When the content of the lanthanoid metals and heavy metals is less than 0.1 wt %, there is the case where no effect is obtained by the addition of the these metals whereas when the content of the lanthanoid metals and heavy metals is 5 wt % or more, there is the case where the reflectance of the metal reflecting layer is reduced.

(7) Also, the invention relates to a method of producing the semi-transmitting and semi-reflecting electrode substrate according to any one of the above (1) to (3), the method comprising a step of etching the above transparent conductive layer which contains indium oxide as its major component and further one or two or more oxides selected from tungsten oxide, molybdenum oxide and niobium oxide and is disposed on the above transparent substrate, by an etchant containing oxalic acid and a step of etching the metal layer connected electrically with the above transparent electrode layer by a mixture acid containing phosphoric acid, acetic acid and nitric acid to form the above metal reflecting layer.

The concentration of oxalic acid in the etchant containing oxalic acid is preferably 1 to 10 wt % and more preferably 1 to 5 wt %. This is because when the concentration of oxalic acid is less than 1 wt %, there is the case where the etching rate of the transparent conductive layer is lowered, whereas when the concentration of oxalic acid exceeds 10 wt %, there is the case where crystals of oxalic acid precipitate in the etchant solution containing oxalic acid.

Each concentration of phosphoric acid, acetic acid and nitric acid in the mixture acid used for etching the metal layer may be properly selected. However, the concentration of phosphoric acid is preferably 40 to 95 wt %, the concentration of acetic acid is preferably 5 to 60 wt % and the concentration of nitric acid is preferably 0.5 to 5 wt %. This mixture acid may be diluted with water as required.

It is preferable to heat the substrate formed with the transparent conductive layer to 200° C. or higher, preferably 220° C. or higher and more preferably 230° C. or higher, thereby crystallizing the transparent conductive layer. If the transparent conductive layer has been crystallized, a damage to the transparent conductive layer can be decreased when the metal layer is etched by a mixture acid containing a phosphoric acid, acetic acid and nitric acid.

(8) Also, the invention relates to a method of producing the semi-transmitting and semi-reflecting electrode substrate according to any one of the above (4) to (6), the method comprising a step of etching the above transparent conductive layer which contains indium oxide as its major component and further one or two or more oxides selected from tungsten oxide, molybdenum oxide and niobium oxide and is disposed on the above transparent substrate, by an etchant containing oxalic acid and a step of etching the above metal layer which connects the above transparent conductive layer electrically with the above TFT element and has a reflectance of 80% or more, by using a mixture acid containing phosphoric acid, oxalic acid and nitric acid.

If the transparent conductive layer is electrically connected with the TFT element by the metal layer, the transparent conductive layer and the metal layer function as the electrodes used to drive a TFT drive system liquid crystal display device. Also, as mentioned above, the transparent conductive layer has the function of almost transmitting light and the metal layer has the function of almost reflecting light. The metal layer functions as a reflector electrode to thereby obtain a semi-transmitting and semi-reflecting electrode substrate.

(9) Also, the invention relates to a liquid crystal display comprising the semi-transmitting and semi-reflecting electrode substrate according to any one of the above (1) to (6) and a liquid crystal layer driven by the above semi-transmitting and semi-reflecting electrode substrate.

Since the liquid crystal display device is provided with the first or second semi-transmitting and semi-reflecting electrode substrate, it has a function as a reflecting type liquid crystal display device and a function as a transparent type liquid crystal display device at the same time.

Second Invention Group

(10) In order to solve the above problem, a semi-transmitting and semi-reflecting electrode substrate comprises a transparent substrate, a transparent conductive layer which is disposed on the above transparent substrate and contains indium oxide as its major component and further one or two or more oxides selected from lanthanoid-based metal oxides and a metal reflecting layer which is disposed on the above transparent substrate and is connected with the above transparent conductive layer.

The descriptions reading as follows: "contains indium oxide as its major component" in this patent means that indium oxide is contained as its principal component and means that the content of indium oxide is 50% or more in terms of weight composition ratio, volumetric ratio or atomic number ratio.

The addition of the lanthanoid-based metal oxide ensures that after the transparent conductive layer is formed, the formed transparent conductive layer can be etched using an etchant containing oxalic acid. The substrate temperature when the film is formed is preferably R.T. (room temperature) to 200° C. and more preferably 80° C. to 180° C. The reason why the substrate temperature when the film is formed is designed to be in the above range is that it is necessary to cool for controlling the substrate temperature to R.T. or less, leading to a loss of energy, whereas when the substrate temperature is designed to be 200° C. or higher, there is the case where the etching using the etchant containing oxalic acid cannot be carried out because of, for example, crystallization of the transparent conductive layer.

Also, water and hydrogen may be added in the atmospheric gas during the course of film formation. This makes it easy to etch the formed transparent conductive layer by using an etchant containing oxalic acid and residues can be more reduced. The concentration of water and hydrogen in the atmospheric gas is preferably 0.1 to 10%. This is because when the concentration of water and hydrogen is less than 0.1%, there is the case where the effect obtained by the addition is too small whereas when the concentration of water and hydrogen is 10% or more, there is the case where the resistance of the formed transparent conductive layer is too large.

The addition of the above metal oxide enables the crystallization of the transparent conductive layer on the substrate simply by heating the temperature of the substrate to 200° C. or higher after the above formed transparent conductive layer is etched. The crystallization temperature is preferably 220° C. or higher and more preferably 230° C. or higher.

If the transparent conductive layer is crystallized, the damages to the transparent conductive layer caused by an etchant constituted of phosphoric acid, acetic acid and nitric acid, which etchant is usually used for a metal reflecting layer can be avoided. Also, the addition of the lanthanoid-based metal oxide makes it possible to suppress a cell reaction.

The film thickness of the transparent conductive layer is preferably 20 to 500 nm, more preferably 30 to 300 nm and still more preferably 30 to 200 nm. When the film thickness of the transparent conductive layer is less than 20 nm, there is the case where the surface resistance of the transparent conductive layer is raised whereas the film thickness of the transparent conductive layer exceeds 500 nm, there is the case where the problems arise concerning a reduction in transmittance and processing accuracy.

The reflectance of the metal reflecting layer is preferably 80% or more. The reflectance according to the invention is measured using a graph in which the ordinate (Y axis) is the reflectance and the abscissa (X axis) is the wavelength. This reflectance is defined as a value obtained by expressing the proportion of the area calculated by actual data of the metal reflecting layer (or metal layer) as % based on the area obtained when the reflectance at each wavelength is set to 100% in a measurable wavelength range of 400 to 700 nm in the graph.

Here, the aforementioned area means the area enclosed by the X axis and the reflectance spectrums in the wavelength range of 400 to 700 nm in the above graph. It is needless to say that this area is equal to the value obtained by integrating the reflectance spectrum with respect to the wavelength of 400 to 700 nm.

The film thickness of the metal reflecting layer is preferably 10 to 1000 nm, more preferably 30 to 300 nm and still more preferably 50 to 200 nm. When the film thickness of the metal reflecting layer is less than 10 nm, there is the case where the reflectance is 80% or more, whereas the film thickness exceeds 1000 nm, there is the case where a problem arises concerning processing accuracy.

Also, the transparent conductive layer is provided with the ability of almost transmitting light, whereas the metal reflecting layer has the ability of almost reflecting light. When the transparent conductive layer having such a function and the above metal reflecting layer connected electrically with the transparent conductive layer are provided at the same time, a semi-transmitting and semi-reflecting electrode substrate is obtained.

(11) Also, the invention relates to a semi-transmitting and semi-reflecting electrode substrate according to the above (10), wherein the value of [In]/[All metals] that is a composition ratio of In in the above transparent conductive layer containing indium oxide as its major component and further one or two or more oxides selected from lanthanoid-based metal oxides is 0.8 to 0.99.

As to the composition ratio of indium oxide in the transparent conductive layer, the composition ratio of In (hereinafter, simply referred to as weight ratio in some cases) is as follows: [In]/[All metals]=0.8 to 0.99 as weight ratio. When the composition ratio of In is less than 0.8, there is the case where the resistance of the transparent conductive layer is increased and the transparent conductive layer is not crystallized even if the substrate on which the transparent conductive layer has been formed is heated to 200° C. or higher. Also, when the composition ratio of In exceeds 0.99, there is the case where the transparent conductive layer is crystallized when the transparent conductive layer is formed and cannot be etched by an etchant containing oxalic acid and residues are generated in a large amount. This is the reason why the composition ratio [In]/[All metals]=0.85 to 0.99. Here, [In] represents the weight of indium oxide per unit volume and [All metals] represents the weight of all metal oxides per unit volume in the transparent conductive layer.

Sn and Zn may be added as third atoms in the above transparent conductive layer. Here, the first atom is an indium atom in indium oxide and the second atom is a lanthanoid-based metal atom in one or two or more of oxides selected from lanthanoid-based metal oxides.

When Sn is added, the composition ratio of Sn, namely, [Sn]/[All metals]<0.2 and more preferably [Sn]/[All metals] <0.1 as weight ratio. When [Sn]/[All metals] in the transparent conductive layer is 0.2 or more, there is the case where residues are generated during etching. Here, [Sn] represents the weight of tin oxide per unit volume in the transparent conductive layer.

When Zn is added, the composition ratio of Zn, namely, [Zn]/[All metals]<0.1 and more preferably [Zn]/[All metals] <0.05 as weight ratio. When [Zn]/[All metals] in the transparent conductive layer is 0.1 or more, there is the case where a mixture acid containing phosphoric acid, acetic acid and nitric acid gives damages to the transparent conductive layer when the metal reflecting layer is etched using the mixture acid. Here, [Zn] represents the weight of zinc oxide per unit volume in the transparent conductive layer.

(12) Also, the invention relates to a semi-transmitting and semi-reflecting electrode substrate according to the above (10) or (11), wherein the above metal reflecting layer has a layer containing Al or Ag as its major components.

Besides Al and Ag as the first metals contained as major components, lanthanoid-based metals such as Nd and heavy metals such as Co, Ni, Pd, Au, Zr, Pt and Cu may be preferably added in the layer (layer containing Al or Ag as its major components) included in the above metal reflecting layer.

It is to be noted that the descriptions "layer containing Al or Ag as its major components" means a layer containing Al or Ag as its major components, and means a layer containing Al or Ag in a ratio of 50% or more in terms of weight composition ratio, volumetric ratio or atomic number ratio.

The content of these lanthanoid-based metals and heavy metals to be added is preferably 0.1 to 5 wt %, more preferably 0.5 to 3 wt % and still more preferably 0.5 to 2 wt %. When the content of the lanthanoid-based metals and heavy metals is less than 0.1 wt %, there is the case where no effect is obtained by the addition of the these metals whereas when the content of the lanthanoid metals and heavy metals is 5 wt % or more, there is the case where the reflectance of the metal reflecting layer is reduced.

(13) A semi-transmitting and semi-reflecting electrode substrate according to any one of the above (10) to (12), wherein the above lanthanoid-based metal oxide is lanthanum oxide, cerium oxide, samarium oxide, gadolinium oxide, dysprosium oxide, erbium oxide or holmium oxide.

(14) A second semi-transmitting and semi-reflecting electrode substrate according to the invention comprises a transparent substrate, a transparent conductive layer which is disposed on the above transparent substrate and contains indium oxide as its major component and further one or two or more oxides selected from lanthanoid oxides, a TFT element disposed on the above transparent substrate and a metal layer which is disposed on the above transparent substrate and connects the above transparent conductive layer electrically with the above TFT element, wherein the above metal layer has a reflectance of 80% or more.

The above TFT element is a Thin Film Transistor (thin film transistor). When the lanthanoid-based metal oxide is added, it is ensured that after the transparent conductive layer is formed, the formed transparent conductive layer can be etched using an etchant containing oxalic acid. The substrate temperature when the film is formed is preferably R.T. (room temperature) to 200° C. or higher and more preferably 80° C.

to 180° C. The reason why the substrate temperature when the film is formed is designed to be in the above range is that it is necessary to cool for controlling the substrate temperature to room temperature or less, leading to a loss of energy, whereas when the substrate temperature is designed to be 200° C. or higher, there is the case where the etching using the etchant containing oxalic acid cannot be carried out because of, for example, crystallization of the transparent conductive layer.

Also, water and hydrogen may be added in the atmospheric gas during the course of film formation. This makes it easy to etch the formed transparent conductive layer by using an etchant containing oxalic acid and residues can be more reduced. The concentration of water and hydrogen in the atmospheric gas is preferably 0.1 to 10%. When the concentration of water and hydrogen is less than 0.1%, there is the case where the effect obtained by the addition is too small whereas when the concentration of water and hydrogen is 10% or more, there is the case where the resistance of the formed transparent conductive layer is too large.

The addition of the above metal oxide enables the crystallization of the transparent conductive layer on the substrate simply by heating the temperature of the substrate to 200° C. after the above formed transparent conductive layer is etched. The crystallization temperature is preferably 220° C. or higher and more preferably 230° C. or higher. If the transparent conductive layer is crystallized, the damages to the transparent conductive layer caused by an etchant constituted of phosphoric acid, acetic acid and nitric acid, which etchant is usually used for a metal reflecting layer can be avoided.

The film thickness of the transparent conductive layer is preferably 20 to 500 nm, more preferably 30 to 300 nm and still more preferably 30 to 200 nm. When the film thickness of the transparent conductive layer is less than 20 nm, there is the case where the surface resistance of the transparent conductive layer is raised whereas the film thickness of the transparent conductive layer exceeds 500 nm, there is the case where the problems arise concerning a reduction in transmittance and processing accuracy.

The film thickness of the metal reflecting layer is preferably 10 to 1000 nm, more preferably 30 to 300 nm and still more preferably 50 to 200 nm. When the film thickness of the metal reflecting layer is less than 10 nm, there is the case where the reflectance is 80% or more, whereas the film thickness exceeds 1000 nm, there is the case where a problem arises concerning processing accuracy.

Also, the transparent conductive layer is provided with the ability of almost transmitting light, whereas the metal layer has the ability of almost reflecting light. When the transparent conductive layer is electrically connected with the TFT element through the metal layer, the transparent conductive layer and the metal layer function as the electrodes to be used in a liquid crystal display device. Also, because the reflectance of the metal layer is 80% or more, the metal layer functions as a reflector electrode resultantly. The metal layer that functions as a reflector electrode and the transparent conductive layer are provided at the same time in this manner to obtain a semi-transmitting and semi-reflecting electrode substrate to be intended.

(15) Also, the invention relates to a semi-transmitting and semi-reflecting electrode substrate according to the above (14), wherein the value of [In]/[All metals] that is a composition ratio of In in the above transparent conductive layer containing indium oxide as its major component and further one or two or more oxides selected from lanthanoid-based metal oxides is 0.8 to 0.99.

As to the composition of the transparent conductive layer, the composition ratio of In is as follows: [In]/[All metals]=0.8 to 0.99 as weight ratio. When the composition ratio of In is less than 0.8, there is the case where the resistance of the transparent conductive layer is increased and the transparent conductive layer is not crystallized even if the substrate on which the transparent conductive layer has been formed is heated to 200° C. or higher. Also, when the composition ratio of indium oxide exceeds 0.99, there is the case where the transparent conductive layer is crystallized when the transparent conductive layer is formed and cannot be etched by an etchant containing oxalic acid and residues are generated in a large amount. This is the reason why the composition ratio [In]/[All metals]=0.8 to 0.99.

Sn and Zn may be added as third atoms in the above transparent conductive layer. Here, the first atom is an indium atom in indium oxide and the second atom is a lanthanoid-based metal atom in one or two or more oxides selected from the lanthanoid-based metal oxides. "Third atom" means an atom after these first and second atoms and means, in short, other atom.

When Sn is added, the composition ratio of Sn, namely, [Sn]/[All metals]<0.2 and more preferably [Sn]/[All metals] <0.1 as weight ratio. When [Sn]/[All metals] in the transparent conductive layer is 0.2 or more, there is the case where residues are generated during etching.

When Zn is added, the composition ratio of Zn, namely, [Zn]/[All metals]<0.1 and more preferably [Zn]/[All metals] <0.05 as weight ratio. When [Zn]/[All metals] in the transparent conductive layer is 0.1 or more, there is the case where a mixture acid containing phosphoric acid, acetic acid and nitric acid gives damages to the transparent conductive layer when the metal reflecting layer is etched using the mixture acid.

(16) Also, the invention relates to a semi-transmitting and semi-reflecting electrode substrate according to the above (14) or (15), wherein the above metal layer having a reflectance of 80% or more has a layer containing Al or Ag as major components.

If the reflectance of the metal layer is not 80% or more, the reflectance for extraneous light is decreased and there is therefore the case where an image on a liquid crystal display is scarcely seen.

As the layer (layer containing Al and Ag as its major components) included in the metal layer, besides Al and Ag, the second metals are also preferably added. As the second metal, lanthanoid-based metals such as Nd and heavy metals such as Co, Ni, Pd, Au, Zr, Pt and Cu may be added.

The content of these lanthanoid-based metals and heavy metals to be added is preferably 0.1 to 5 wt %, more preferably 0.5 to 3 wt % and still more preferably 0.5 to 2 wt %. When the content of the lanthanoid metals and heavy metals is less than 0.1 wt %, there is the case where no effect is obtained by the addition of the these metals whereas when the content of the lanthanoid metals and heavy metals is 5 wt % or more, there is the case where the reflectance of the metal reflecting layer is reduced.

(17) Also, the invention relates to a semi-transmitting and semi-reflecting electrode substrate according to any one of the above (14) to (16), wherein the above lanthanoid-based metal oxide is lanthanum oxide, cerium oxide, samarium oxide, gadolinium oxide, dysprosium oxide, erbium oxide or holmium oxide.

(18) Also, the invention relates to a method of producing the semi-transmitting and semi-reflecting electrode substrate according to any one of the above (10) to (13), the method comprising a step of etching the above transparent conductive layer which contains indium oxide as its major component and further one or two or more oxides selected from lanthanoid-based metal oxides and is disposed on the above transparent substrate, by an etchant containing oxalic acid and a step of etching the metal layer connected electrically with the above transparent electrode layer by a mixture acid containing phosphoric acid, acetic acid and nitric acid to form the above metal reflecting layer.

The concentration of oxalic acid in the etchant containing oxalic acid is preferably 1 to 10 wt % and more preferably 1 to 5 wt %. This is because when the concentration of oxalic acid is less than 1 wt %, there is the case where the etching rate of the transparent conductive layer is lowered, whereas when the concentration of oxalic acid exceeds 10 wt %, there is the case crystals of oxalic acid precipitate in the etchant solution containing oxalic acid.

Each concentration of phosphoric acid, acetic acid and nitric acid in the mixture acid used for etching the metal layer may be properly selected. However, the concentration of phosphoric acid is preferably 40 to 95 wt %, the concentration of acetic acid is preferably 5 to 60 wt % and the concentration of nitric acid is preferably 0.5 to 5 wt %. This mixture acid may be diluted with water as required.

It is preferable to heat the substrate formed with the transparent conductive layer to 200° C. or higher, preferably 220° C. or higher and more preferably 230° C. or higher, thereby crystallizing the transparent conductive layer before or after the metal layer is formed. If the transparent conductive layer has been crystallized, a damage to the transparent conductive layer can be decreased when the metal layer is etched by a mixture acid containing a phosphoric acid, acetic acid and nitric acid.

(19) Also, the invention relates to a method of producing the semi-transmitting and semi-reflecting electrode substrate according to any one of the above (14) to (17), the method comprising a step of etching the above transparent conductive layer which contains indium oxide as its major component and further containing one or two or more oxides selected from lanthanoid-based metal oxides and is disposed on the above transparent substrate, by an etchant containing oxalic acid and a step of etching the metal layer which connects the above transparent electrode layer electrically with a TFT element and has a reflectance of 80% or more, by a mixture acid containing phosphoric acid, acetic acid and nitric acid to form the above metal reflecting layer.

When the transparent conductive layer is electrically connected with the TFT element by the metal layer, the transparent conductive layer and the metal layer can function as a TFT driving system liquid crystal driving electrodes. Also, as mentioned above, the transparent conductive layer is provided with the ability of almost transmitting light, whereas the metal layer has the ability of almost reflecting light. When the metal layer functions as a reflector electrode, a semi-transmitting and semi-reflecting electrode substrate is obtained.

(20) Also, the invention relates to a method of producing a semi-transmitting and semi-reflecting electrode substrate according to the above (18) or (19), wherein the above lanthanoid-based metal oxide is lanthanum oxide, cerium oxide, samarium oxide, gadolinium oxide, dysprosium oxide, erbium oxide or holmium oxide.

(21) Also, the invention relates to a liquid crystal display comprising the semi-transmitting and semi-reflecting electrode substrate according to any one of the above (10) to (17) and a liquid crystal layer driven by the above semi-transmitting and semi-reflecting electrode substrate.

Since the liquid crystal display device is provided with the semi-transmitting and semi-reflecting electrode substrate according to any one of the above (10) to (17), it has a function as a reflecting type liquid crystal display device and a function as a transparent type liquid crystal display device at the same time.

Effect of the Invention

As mentioned above, the semi-transmitting and semi-reflecting electrode substrate almost prevents residues from being generated when the transparent conductive layer is etched using a weak acid (for example, organic acids, especially, oxalic acid) and is provided with a transparent conductive layer resistant to an etchant (mixture acid) used for the metal reflecting layer (metal layer) when the metal reflecting layer (metal layer) above the transparent conductive layer is etched. The semi-transmitting and semi-reflecting electrode substrate of the invention is therefore superior in processability.

Also, the method of producing a semi-transmitting and semi-reflecting electrode substrate according to the invention enables the provision of a semi-transmitting and semi-reflecting electrode substrate which almost prevents residues from being generated when the transparent conductive layer is etched using a weak acid (for example, organic acids, especially, oxalic acid) and is provided with a transparent conductive layer resistant to an etchant (mixture acid) used for the metal reflecting layer (metal layer) when the metal reflecting layer (metal layer) above the transparent conductive layer is etched. Therefore, this method improves the yield in the process of producing this semi-transmitting and semi-reflecting electrode substrate.

Also, the liquid crystal display device of the present invention is provided with the above semi-transmitting and semi-reflecting electrode substrate, thereby improving production efficiency.

BRIEF DESCRIPTION OF THE DRAWINGS

FIG. 1 is a partial sectional view of an α-SiTFT active matrix substrate in this embodiment.

EXPLANATIONS OF THE SYMBOLS

1. Glass substrate
2. Gate electrode
3. Gate insulation film
4. α-Si:H(i) film
5. Channel protective film
6. α-Si:H(n) film
7. Drain electrode
8. Source electrode
9. Transparent conductive film
10. Transparent resin resist
10a. Through-hole
11. Reflector electrode
12. Gate electrode wiring
100. α-SiTFT active matrix substrate

PREFERRED EMBODIMENTS OF THE INVENTION

Preferred embodiments of the invention will be explained with reference to the drawings. The embodiments are divided into an A-group and a B-group. The A-group is embodiments of the first invention group and the B-group is embodiments are embodiments of the second invention group.

A-Group

Embodiment A-1

FIG. 1 shows a partial sectional view of an α-SiTFT (amorphous silicon thin-film transistor) active matrix substrate 100 in this embodiment A-1. Metal Al was deposited on a transmittable glass substrate 1 by high-frequency sputtering such that it had an film thickness of 1500 angstroms and metal Mo was deposited on the metal Al such that it had a film thickness of 500 angstroms. This glass substrate 1 corresponds to one example of the transparent substrate as described in the claims of this patent application.

Next, the above deposited metal Al and metal Mo were etched into the form shown in FIG. 1 according to a photo-etching method using a phosphoric acid/acetic acid/nitric acid/water (volumetric ratio: 12/6/1/1)-based aqueous solution as an etching solution to form a gate electrode 2 and a gate electrode wiring 12.

Then, a silicon nitride film (hereinafter, referred to as a SiN film in some cases), which was to be a gate insulating film 3, was deposited by a glow discharge CVD method on the above glass substrate 1, the above gate electrode 2 and the above gate electrode wiring 12 such that it had a film thickness of 3000 angstroms. In succession, an α-Si:H(i) film 4 was deposited on the gate insulating film 3 such that it had a film thickness of 3500 angstroms. Moreover, a silicon nitride film (SiN film) which was to be a channel protective layer 5 was deposited on the above α-Si:H(i) film 4 such that it had a film thickness of 3000 angstroms.

At this time, as the discharge gas, $SiH_4$—$NH_3$—$N_2$-based mixture gas was used for the gate insulating film 3 and channel protective layer 5 which were formed of a SiN film whereas $SiH_4$—$N_2$-based mixture gas was used for the α-Si:H(i) film 4. Also, the channel protective layer 5 made of a SiN film was etched into the form shown in FIG. 1 by dry etching using CHF-based gas.

In succession, an α-Si:H(n) film 6 was deposited on the above α-Si:H(i) film 4 and the above channel protective layer 5 by using $SiH_4$—$H_2$—$PH_3$-based mixture gas such that it had a film thickness of 3000 angstroms.

A three-layer film of metal Mo/metal Al/metal Mo was further deposited in this order on the deposited α-Si:H(n) by a sputtering method such that the film thickness of the lower layer metal Mo was 0.05 μm, the film thickness of the metal Al was 0.2 μm and the film thickness of the upper layer metal Mo was 0.05 μm.

This metal Mo/Metal Al/metal Mo three-layer film was etched into the form shown in FIG. 1 by a photoetching method using a phosphoric acid/acetic acid/nitric acid/water (volumetric ratio: 9:8:1:2)-based aqueous solution to form a pattern of a drain electrode 7 and a pattern of source electrode 8. Moreover, dry etching using CHF-based gas and wet etching using a hydrazine ($NH_2NH_2 \cdot H_2O$)-based aqueous solution were combined to etch the α-Si:H(i) film 4 and α-Si:H(n) film 6 formed of an α-Si:H film, thereby forming a pattern of α-Si:H(i) film 4 and a pattern of the α-Si:H(n) film 6 having the forms shown in FIG. 1. Also, as shown in FIG. 1, a transparent resin resist 10 was used to form a protective film, thereby forming a pattern of a through-hole 10a and the like.

Transparent Conductive Film Containing Tungsten Oxide

An amorphous transparent conductive film 9 containing indium oxide as its major component and tungsten oxide was deposited on this gate insulating film 3 by a sputtering method. The target used in this sputtering method was an $In_2O_3$—$WO_3$ sintered body that was adjusted such that [In]/([In]+[W]) showing the atomic ratio of In to W in the target became 0.97. Here, [In] represents the number of indium atoms per unit volume and [W] represents the number of tungsten atoms per unit volume.

In the sputtering, this $In_2O_3$—$WO_3$ sintered body was placed and used as the cathode in a planer magnetron type to deposit the transparent conductive film 9 such that the film thickness was 1000 angstroms. At this time, as the discharge gas in the sputtering, pure argon gas or argon gas mixed with $O_2$ gas contained in a trace amount of the order of about 1 vol % was used. This transparent conductive film 9 corresponds to one example of the transparent conductive layer as described in the claim of the patent application.

As to the form of tungsten in the target, tungsten may be dispersed in the form of tungsten oxide such as $WO_3$ or $WO_2$ or in the form of a complex oxide between indium oxide and tungsten oxide such as $In_2W_3O_{12}$ in the indium oxide sintered body. A preferable form of tungsten is as follows: tungsten is substituted for the indium site of indium oxide whereby it is dispersed as a solid solution at an atomic level in the indium oxide sintered body. It is rather effective that tungsten is dispersed at an atomic level in the indium oxide sintered body in this manner to stabilize the discharging in sputtering, thereby obtaining the transparent conductive film 9 having a low resistance.

The transparent conductive film 9 which was an $In_2O_3$—$WO_3$ film formed by the above sputtering was analyzed by an X-ray diffraction method, to find that no peak was observed, showing this film to be amorphous. It was also found that the specific resistance of the transparent conductive film 9 that was the $In_2O_3$—$WO_3$ film was about $3.8 \times 10^{-4}$ Ω·cm and was therefore a film used satisfactorily as an electrode.

This transparent conductive film 9, which was the In2O3-WO3 film, was etched by a photoetching method using an 3.2 wt % aqueous oxalic acid solution as an etchant so as to form a pattern of a transmitting pixel electrode. A pattern of a transmitting pixel electrode made of an amorphous electrode of the transparent conductive film 9 shown in FIG. 1 was formed. It is to be noted that this 3.2 wt % aqueous oxalic acid solution corresponds to one example of the etchant containing oxalic acid as described in the claims of the patent application.

Then, the substrate formed with the above transparent conductive film 9 was heat-treated at 250° C. for 30 minutes. After that, metal Co was deposited on a transparent resin resist 10 by high-frequency sputtering such that it had an film thickness of 500 angstroms and metal Al was deposited on the metal Mo such that it had a film thickness of 2000 angstroms. The reflectance of the layer comprising metal Mo and metal Al was measured to find that the reflectance was 80% or more. This layer comprising metal Mo and metal Al corresponds to one example of the metal layer as described in the claims of this patent application.

The above metal Mo and metal Al were etched by a photoetching method using a phosphoric acid/acetic acid/nitric acid/water (volumetric ratio: 9:6:1:2)-based aqueous solution as an etching solution to form a pattern of a reflector electrode 11 as shown in FIG. 1. At this time, the reflector electrode 11 comprising metal Mo and metal Al was patterned such that the pattern of the source electrode 8 was electrically in contact with the pattern of the transmitting pixel electrode comprising the transparent conductive film 9 as shown in FIG. 1. At this time, the drain electrode 7 and source electrode 8 that contained metal Al were not eluted by the etching solution. The reflectance of this reflector electrode 11 was measured to find that it was 80% or more.

This reflector electrode 11 corresponds to one example of the metal reflecting layer as described in the claims of the patent application and the phosphoric acid/acetic acid/oxalic acid/water (volumetric ratio: 9:6:1:2)-based aqueous solution as an etching solution corresponds to one example of the mixture acid of phosphoric acid/acetic acid/nitric acid as described in the claims of the patent application.

After that, a SiN passivation film (not shown) and a shielding film pattern (not shown) were formed to produce an α-SiTFT active matrix substrate 100 as shown in FIG. 1. A liquid crystal layer was formed on this α-SiTFT active matrix substrate 100 to thereby produce a TFT-LCD system flat display. This α-SiTFT active matrix substrate 100 corresponds to one example of the semi-transmitting and semi-reflecting electrode substrate as described in the claims of the patent application and the TFT-LCD system flat display corresponds to one example of the liquid crystal display device as described in the claims of the patent application.

Embodiment A-2

An α-SiTFT active matrix substrate 100 in this embodiment A-2 has the same structure as that shown in FIG. 1 except only that the composition of the transparent conductive film 9 of the α-SiTFT active matrix substrate 100 in this embodiment A-2 is different from that of the above embodiment A-1. Therefore, the α-SiTFT active matrix substrate 100 of this embodiment A-2 will be explained also with reference to FIG. 1.

As shown in FIG. 1, metal Al was deposited on a transmittable glass substrate 1 by high-frequency sputtering such that it had an film thickness of 1500 angstroms and metal Mo was deposited on the metal Al such that it had a film thickness of 500 angstroms. Next, the above deposited metal Al and metal Mo were etched into the form shown in FIG. 1 according to a photoetching method using a phosphoric acid/acetic acid/nitric acid/water (volumetric ratio: 12:6:1:1)-based aqueous solution as an etching solution to form a gate electrode 2 and a gate electrode wiring 12. This glass substrate 1 corresponds to one example of the transparent substrate as described in the claims of this patent application.

Then, a silicon nitride film (hereinafter, referred to as a SiN film in some cases), which was to be a gate insulating film 3, was formed on the above glass substrate 1, the above gate electrode 2 and the above gate electrode wiring 12 by a glow discharge CVD method such that it had a film thickness of 3000 angstroms. In succession, an α-Si:H(i) film 4 was deposited on the gate insulating film 3 such that it had a film thickness of 3500 angstroms. Moreover, a silicon nitride film (SiN film) which was to be a channel protective layer 5 was deposited on the above α-Si:H(i) film 4 such that it had a film thickness of 3000 angstroms.

At this time, as the discharge gas, $SiH_4$—$NH_3$—$N_2$-based mixture gas was used for the gate insulating film 3 and channel protective layer 5 which were formed of a SiN film whereas $SiH_4$—$N_2$-based mixture gas was used for the α-Si:H(i) film 4. Also, the channel protective layer 5 made of a SiN film was etched into the form shown in FIG. 1 by dry etching using CHF-based gas.

In succession, an α-Si:H(n) film 6 was deposited on the above α-Si:H(i) film 4 and the above channel protective layer 5 by using $SiH_4$—$H_2$—$PH_3$-based mixture gas such that it had a film thickness of 3000 angstroms.

A three-layer film of metal Mo/metal Al/metal Mo was further deposited in this order on the deposited α-Si:H(n) 6 by a sputtering method such that the film thickness of the lower layer metal Mo was 0.05 μm, the film thickness of the metal Al was 0.2 μm and the film thickness of the upper layer metal Mo was 0.05 μm.

This metal Mo/Metal Al/metal Mo three-layer film was etched into the form shown in FIG. 1 by a photoetching method using a phosphoric acid/acetic acid/nitric acid/water (volumetric ratio: 9:8:1:2)-based aqueous solution to form a pattern of a drain electrode 7 and a pattern of source electrode 8. Moreover, dry etching using CHF-based gas and wet etching using a hydrazine ($NH_2NH_2.H_2O$)-based aqueous solution were combined to etch the α-Si:H(i) film 4 and α-Si:H(n) film 6 formed of an α-Si:H film, thereby forming a pattern of α-Si:H(i) film 4 and a pattern of the α-Si:H(n) film 6 having the forms shown in FIG. 1. Also, as shown in FIG. 1, a transparent resin resist 10 was used to form a protective film, thereby forming a pattern of a through-hole and the like.

Transparent Conductive Film Containing Molybdenum Oxide

An amorphous transparent conductive film 9 containing indium oxide as its major component and molybdenum oxide was deposited on this gate insulating film 3 by a sputtering method. The target used in this sputtering method was an $In_2O_3$—$MoO_3$ sintered body that was adjusted such that [In]/([In]+[Mo]) showing the atomic ratio of In to Mo in the target became 0.90. Here, [In] represents the number of indium atoms per unit volume and [Mo] represents the number of molybdenum atoms per unit volume.

In the sputtering, this $In_2O_3$—$MoO_3$ sintered body was placed and used as the cathode in a planer magnetron type to deposit the transparent conductive film 9 such that the film thickness was 1000 angstroms. At this time, as the discharge gas in the sputtering, pure argon gas or argon gas mixed with $O_2$ gas contained in a trace amount of the order of about 1 vol % was used. This transparent conductive film 9 corresponds to one example of the transparent conductive layer as described in the claim of the patent application.

As to the form of the molybdenum element in the target, it may be dispersed in the form of molybdenum oxide such as $MoO_3$ or $MoO_2$. However, the molybdenum element may be used in the form of a complex oxide between indium oxide and molybdenum oxide such as $InMo_4O_6$, $In_2Mo_3O_{12}$ or $In_{11}Mo_4O_{62}$ in the indium oxide sintered body. A preferable form of molybdenum is as follows: a molybdenum atom is substituted for the indium site of indium oxide whereby it is dispersed as a solid solution at an atomic level in the indium oxide crystals. It is rather effective that molybdenum is dispersed at an atomic level in the indium oxide sintered body in this manner to stabilize the discharging in sputtering, thereby obtaining the transparent conductive film 9 having a low resistance.

The transparent conductive film 9 which was an $In_2O_3$—$MoO_3$ film formed by the above sputtering was analyzed by an X-ray diffraction method, to find that no peak was observed, showing this film to be amorphous. It was also found that the specific resistance of the transparent conductive film 9 that was the $In_2O_3$—$MoO_3$ film was about $3.4 \times 10^{-4}$ Ω·cm and was therefore a film used satisfactorily as an electrode.

This transparent conductive film 9, which was the In2O3-MoO3 film, was etched by a photoetching method using an 3.2 wt % aqueous oxalic acid solution as an etchant so as to form a pattern of a transmitting pixel electrode. A pattern of a transmitting pixel electrode made of an amorphous electrode of the transparent conductive film 9 shown in FIG. 1 was formed. It is to be noted that this 3.2 wt % aqueous oxalic acid solution corresponds to one example of the etchant containing oxalic acid as described in the claims of the patent application.

Then, the substrate formed with the above transparent conductive film 9 was heat-treated at 250° C. for 30 minutes. After that, metal Co was deposited on the substrate by high-frequency sputtering such that it had an film thickness of 500 angstroms and metal Al was deposited on the metal Mo such that it had a film thickness of 2000 angstroms. The reflectance of the layer comprising metal Mo and metal Al was measured to find that the reflectance was 80% or more. This layer comprising metal Mo and metal Al corresponds to one example of the metal layer as described in the claims of this patent application.

The above metal Mo and metal Al were etched by a photoetching method using a phosphoric acid/acetic acid/nitric acid/water (volumetric ratio: 9:6:1:2)-based aqueous solution as an etching solution to form a pattern of a reflector electrode 11 as shown in FIG. 1. At this time, the reflector electrode 11 was patterned such that the pattern of the source electrode 8 was electrically in contact with the pattern of the transmitting pixel electrode comprising the transparent conductive film 9 as shown in FIG. 1. At this time, the drain electrode 7 and source electrode 8 that contained metal Al were neither burned out nor narrowed. The reflectance of this reflector electrode 11 was measured to find that it was 80% or more.

This reflector electrode 11 corresponds to one example of the metal reflecting layer as described in the claims of the patent application and the phosphoric acid/acetic acid/oxalic acid/water (volumetric ratio: 9:6:1:2)-based aqueous solution as an etching solution corresponds to one example of the mixture acid of phosphoric acid/acetic acid/oxalic acid as described in the claims of the patent application.

After that, a SiN passivation film (not shown) and a shielding film pattern (not shown) were formed to produce an α-SiTFT active matrix substrate 100 as shown in FIG. 1. A liquid crystal layer was formed on this α-SiTFT active matrix substrate 100 to thereby produce a TFT-LCD system flat display. This α-SiTFT active matrix substrate 100 corresponds to one example of the semi-transmitting and semi-reflecting electrode substrate as described in the claims of the patent application and the TFT-LCD system flat display corresponds to one example of the liquid crystal display device as described in the claims of the patent application.

Embodiment A-3

An α-SiTFT active matrix substrate 100 in this embodiment A-3 has the same structure as that shown in FIG. 1 except only that the composition of the transparent conductive film 9 of the α-SiTFT active matrix substrate 100 in this embodiment A-3 is different from that of the above embodiment A-1. Therefore, the α-SiTFT active matrix substrate 100 of this embodiment A-3 will be explained also with reference to FIG. 1.

As shown in FIG. 1, metal Al was deposited on a transmittable glass substrate 1 by high-frequency sputtering such that it had an film thickness of 1500 angstroms and metal Mo was deposited on the metal Al such that it had a film thickness of 500 angstroms. Next, the above deposited metal Al and metal Mo were etched into the form shown in FIG. 1 according to a photoetching method using a phosphoric acid/acetic acid/nitric acid/water (volumetric ratio: 12:6:1:1)-based aqueous solution as an etching solution to form a gate electrode 2 and a gate electrode wiring 12. This glass substrate 1 corresponds to one example of the transparent substrate as described in the claims of this patent application.

Then, a silicon nitride film (hereinafter, referred to as a SiN film in some cases), which was to be a gate insulating film 3, was formed on the above glass substrate 1, the above gate electrode 2 and the above gate electrode wiring 12 by a glow discharge CVD method such that it had a film thickness of 3000 angstroms. In succession, an α-Si:H(i) film 4 was formed on the gate insulating film 3 such that it had a film thickness of 3500 angstroms. Moreover, a silicon nitride film (SiN film) which was to be a channel protective layer 5 was formed on the above α-Si:H(i) film 4 such that it had a film thickness of 3000 angstroms.

At this time, as the discharge gas, $SiH_4$—$NH_3$—$N_2$-based mixture gas was used for the gate insulating film 3 and channel protective layer 5 which were formed of a SiN film whereas $SiH_4$—$N_2$-based mixture gas was used for the α-Si:H(i) film 4. Also, the channel protective layer 5 formed of a SiN film was etched into the form shown in FIG. 1 by dry etching using CHF-based gas.

In succession, an α-Si:H(n) film 6 was deposited on the above α-Si:H(i) film 4 and the above channel protective layer 5 by using $SiH_4$—$H_2$—$PH_3$-based mixture gas such that it had a film thickness of 3000 angstroms.

A three-layer film of metal Mo/metal Al/metal Mo was further deposited in this order on the deposited α-Si:H(n) 6 by a sputtering method such that the film thickness of the lower layer metal Mo was 0.051 μm, the film thickness of the metal Al was 0.2 μm and the film thickness of the upper layer metal Mo was 0.05 μm.

This metal Mo/Metal Al/metal Mo three-layer film was etched into the form shown in FIG. 1 by a photoetching method using a phosphoric acid/acetic acid/nitric acid/water (volumetric ratio: 9:8:1:2)-based aqueous solution to form a pattern of a drain electrode 7 and a pattern of source electrode 8. Moreover, dry etching using CHF-based gas and wet etching using a hydrazine ($NH_2NH_2.H_2O$)-based aqueous solution were combined to etch the α-Si:H(i) film 4 and α-Si:H(n) film 6 formed of an α-Si:H film, thereby forming a pattern of α-Si:H(i) film 4 and a pattern of the α-Si:H(n) film 6 having the forms shown in FIG. 1.

Transparent Conductive Film Containing Niobium Oxide

An amorphous transparent conductive film 9 containing indium oxide as its major component and niobium oxide was deposited on this gate insulating film 3 by a sputtering method. The target used in this sputtering method was an $In_2O_3$—$Nb_2O_5$ sintered body that was adjusted such that [In]/([In]+[Nb]) showing the atomic ratio of In to Nb in the target became 0.95. Here, [In] represents the number of indium atoms per unit volume and [Nb] represents the number of niobium atoms per unit volume.

In the sputtering, this $In_2O_3$—$Nb_2O_5$ sintered body was placed and used as the cathode in a planer magnetron type to deposit the transparent conductive film 9 such that the film thickness was 1000 angstroms. At this time, as the discharge gas in the sputtering, pure argon gas or argon gas mixed with $O_2$ gas contained in a trace amount of the order of about 1 vol % was used. This transparent conductive film 9 corresponds to one example of the transparent conductive layer as described in the claim of the patent application.

As to the form of the niobium element in the target, it may be dispersed in the form of niobium oxide such as $Nb_2O_5$ or $Nb_2O_3$. However, the niobium element may be dispersed in the form of a complex oxide between indium oxide and niobium oxide such as $InNbO_4$ in the indium oxide sintered body. A preferable form of niobium is as follows: niobium is substituted for the indium site of indium oxide whereby it is dispersed as a solid solution at an atomic level in the indium oxide crystals. It is rather effective that niobium is dispersed at an atomic level in the indium oxide sintered body in this manner to stabilize the discharging in sputtering, thereby obtaining the transparent conductive film 9 having a low resistance.

The transparent conductive film 9 which was an $In_2O_3$—$Nb_2O_5$ film formed by the above sputtering was analyzed by an X-ray diffraction method, to find that no peak was observed, showing this film to be amorphous. It was also found that the specific resistance of the transparent conductive film 9 that was the $In_2O_3$—$Nb_2O_5$ film was about $3.6 \times 10^{-4}$ $\Omega \cdot cm$ and was therefore a film used satisfactorily as an electrode.

This transparent conductive film 9, which was the In2O3-Nb2O5 film, was etched by a photoetching method using an 3.2 wt % aqueous oxalic acid solution as an etchant so as to form a pattern of a transmitting pixel electrode. A pattern of a transmitting pixel electrode made of an amorphous electrode of the transparent conductive film 9 shown in FIG. 1 was formed. It is to be noted that this 3.2 wt % aqueous oxalic acid solution corresponds to one example of the etchant containing oxalic acid as described in the claims of the patent application.

Then, the substrate formed with the above transparent conductive film 9 was heat-treated at 250° C. for 30 minutes. Then, a transparent resin resist 10 is formed into a pattern shown in FIG. 1 on the TFT element and in the vicinity of the transmitting pixel electrode comprising the transparent conductive film 9 such that it functions as a flattening layer for controlling the liquid crystal film thickness of a layer insulation film and a reflector electrode 11. Here, the TFT element is a thin film transistor and is constituted of the gate electrode 2, the α-Si:H(i) film 4, the drain electrode 7 and the source electrode 8 as shown in FIG. 1.

Metal Co was deposited on this transparent resin resist 10 by high-frequency sputtering such that it had an film thickness of 500 angstroms and metal Al was deposited on the metal Mo such that it had a film thickness of 2000 angstroms. The reflectance of the layer comprising metal Mo and metal Al was measured to find that the reflectance was 80% or more. This layer comprising metal Mo and metal Al corresponds to one example of the metal layer as described in the claims of this patent application.

The above metal Mo and metal Al were etched by a photoetching method using a phosphoric acid/acetic acid/nitric acid/water (volumetric ratio: 9:6:1:2)-based aqueous solution as an etching solution to form a pattern of a reflector electrode 11 as shown in FIG. 1. At this time, the reflector electrode 11 was patterned such that the pattern of the source electrode 8 was electrically in contact with the pattern of the transmitting pixel electrode comprising the transparent conductive film 9 as shown in FIG. 1. At this time, the drain electrode 7 and source electrode 8 that contained metal Al were not eluted by the etching solution. The reflectance of this reflector electrode 11 was measured to find that it was 80% or more.

This reflector electrode 11 corresponds to one example of the metal reflecting layer as described in the claims of the patent application and the phosphoric acid/acetic acid/nitric acid/water (volumetric ratio: 9:6:1:2)-based aqueous solution corresponds to one example of the mixture acid constituted of phosphoric acid/acetic acid/nitric acid as described in the claims of the patent application.

After that, a SiN passivation film (not shown) and a shielding film pattern (not shown) were formed to produce an α-SiTFT active matrix substrate 100 as shown in FIG. 1. A liquid crystal layer was formed on this α-SiTFT active matrix substrate 100 to thereby produce a TFT-LCD system flat display. This α-SiTFT active matrix substrate 100 corresponds to one example of the semi-transmitting and semi-reflecting electrode substrate as described in the claims of the patent application and the TFT-LCD system flat display corresponds to one example of the liquid crystal display device as described in the claims of the patent application.

Modified embodiment A-1

In the above embodiments A-1 to A-3, examples in which the reflector electrode 11 is constituted of a metal Mo layer and a metal Al layer are shown. The reflector electrode 11 of this embodiment is preferably constituted of a metal Ag layer in place of the metal Al layer. Specifically, the reflector electrode 11 of this embodiment is preferably constituted of metal Mo and metal Ag. In the case where the reflector electrode 11 contains the metal Ag layer in place of a metal Al layer in this manner, the reflector electrode 11 of this modified embodiment 1 produces the same action effect as the reflector electrode 11 of the above embodiments A-1 to A-3.

Also, in the above embodiments A-1 to A-3, an example is shown in which the metal Al layer contained in the reflector electrode 11 is constituted of pure Al (Al: 100%). This metal Al layer preferably contains lanthanoid-based metals such as Nd and heavy metals such as Co, Ni, Pd, Au, Zr, Pt and Cu besides metal Al. The metal Ag layer also preferably contains the aforementioned lanthanoid-based metals and heavy metals. In this case, the reflector electrode 11 of this modified embodiment 1 also produces the same action effect as each of the reflector electrodes II of the embodiments 1 to 3.

Embodiments of a B-Group

Embodiment B-1

This embodiment B-1 also adopts the same structure as the embodiments of the A-group mentioned above. Therefore, this embodiment B-1 will be explained with reference to FIG. 1 in the same manner as the examples explained above.

FIG. 1 shows a partial sectional view of an α-SiTFT (amorphous silicon thin-film transistor) active matrix substrate 100 in this embodiment B-1. Metal Al was deposited on a transmittable glass substrate 1 by high-frequency sputtering such that it had an film thickness of 1500 angstroms and metal Mo was deposited on the metal Al such that it had a film thickness of 500 angstroms. This glass substrate 1 corresponds to one example of the transparent substrate as described in the claims of this patent application.

Next, the above deposited metal Al and metal Mo were etched into the form shown in FIG. 1 according to a photoetching method using a phosphoric acid/acetic acid/nitric acid/water (volumetric ratio: 12:6:1:1)-based aqueous solution as an etching solution to form a gate electrode 2 and a gate electrode wiring 12.

Then, a silicon nitride film (hereinafter, referred to as a SiN film in some cases), which was to be a gate insulating film 3, was deposited by a glow discharge CVD method on the above glass substrate 1, the above gate electrode 2 and the above gate electrode wiring 12 such that it had a film thickness of 3000 angstroms. In succession, an α-Si:H(i) film 4 was deposited on the gate insulating film 3 such that it had a film thickness of 3500 angstroms. Moreover, a silicon nitride film (SiN film) which was to be a channel protective layer 5 was deposited on the above α-Si:H(i) film 4 such that it had a film thickness of 3000 angstroms.

At this time, as the discharge gas, $SiH_4$—$NH_3$—$N_2$-based mixture gas was used for the gate insulating film 3 and channel protective layer 5 which were formed of a SiN film whereas $SiH_4$—$N_2$-based mixture gas was used for the α-Si:

H(i) film 4. Also, the channel protective layer 5 made of a SiN film was etched into the form shown in FIG. 1 by dry etching using CHF-based gas.

In succession, an α-Si:H(n) film 6 was deposited on the above α-Si:H(i) film 4 and the above channel protective layer 5 by using $SiH_4$—$H_2$—$PH_3$-based mixture gas such that it had a film thickness of 3000 angstroms.

A three-layer film of metal Mo/metal Al/metal Mo was further deposited in this order on the deposited α-Si:H(n) 6 by a sputtering method such that the film thickness of the lower layer metal Mo was 0.05 µm, the film thickness of the metal Al was 0.2 µm and the film thickness of the upper layer metal Mo was 0.05 µm.

This metal Mo/Metal Al/metal Mo three-layer film was etched into the form shown in FIG. 1 by photoetching using a phosphoric acid/acetic acid/nitric acid/water (volumetric ratio: 9:8:1:2)-based aqueous solution as an etching solution to form a pattern of a drain electrode 7 and a pattern of source electrode 8. Moreover, dry etching using CHF-based gas and wet etching using a hydrazine ($NH_2NH_2.H_2O$)-based aqueous solution were combined to etch the α-Si:H(i) film 4 and α-Si:H(n) film 6 formed of an α-Si:H film, thereby forming a pattern of α-Si:H(i) film 4 and a pattern of the α-Si:H(n) film 6 having the forms shown in FIG. 1. Also, as shown in FIG. 1, a transparent resin resist 10 was used to form a protective film, thereby forming a pattern of a through-hole 10a and the like.

Transparent Conductive Film Containing Dysprosium Oxide

An amorphous transparent conductive film 9 containing indium oxide as its major component and dysprosium oxide was deposited on this gate insulating film 3 by a sputtering method. The target used in this sputtering method was an $In_2O_3$—$Dy_2O_3$ sintered body that was adjusted such that $[In_2O_3]/([In_2O_3]+[Dy_2O_3])$ showing the weight ratio of $In_2O_3$ to $Dy_2O_3$ in the target became 0.97. Here, $[In_2O_3]$ represents the weight of indium oxide per unit volume in the transparent conductive film 9 and $[Dy_2O_3]$ represents the weight of dysprosium oxide per unit volume in the transparent conductive film 9.

In the sputtering, this $In_2O_3$—$Dy_2O_3$ sintered body was placed and used as the cathode in a planer magnetron type to deposit the transparent conductive film 9 such that the film thickness was 1000 angstroms. At this time, as the discharge gas in the sputtering, pure argon gas or argon gas mixed with $O_2$ gas contained in a trace amount of the order of about 1 vol % was used. This transparent conductive film 9 corresponds to one example of the transparent conductive layer as described in the claim of the patent application.

As to the form of dysprosium in the target, dysprosium may be dispersed in the form of dysprosium oxide such as $Dy_2O_3$ or in the form of a complex oxide between indium oxide and dysprosium oxide such as $DyInO_3$ in the indium oxide sintered body. A preferable form of dysprosium is as follows: a dysprosium atom is substituted for the indium site of indium oxide whereby it is dispersed as a solid solution at an atomic level in the indium oxide sintered body. It is rather effective that dysprosium is dispersed at an atomic level in the indium oxide sintered body in this manner to stabilize the discharging in sputtering, thereby obtaining the transparent conductive film 9 having a low resistance.

The transparent conductive film 9 which was an $In_2O_3$—$Dy_2O_3$ film formed by the above sputtering was analyzed by an X-ray diffraction method, to find that no peak was observed, showing this film to be amorphous. It was also found that the specific resistance of the transparent conductive film 9 that was the $In_2O_3$—$Dy_2O_3$ film was about $5.2 \times 10^{-4}$ Ω·cm and was therefore a film used satisfactorily as an electrode.

This transparent conductive film 9, which was the In2O3-Dy2O3 film, was etched by a photoetching method using an 3.2 wt % aqueous oxalic acid solution as an etchant so as to form a pattern of a transmitting pixel electrode. A pattern of a transmitting pixel electrode made of an amorphous electrode of the transparent conductive film 9 shown in FIG. 1 was formed. It is to be noted that this 3.2 wt % aqueous oxalic acid solution corresponds to one example of the etchant containing oxalic acid as described in the claims of the patent application.

Then, the substrate formed with the above transparent conductive film 9 was heat-treated at 250° C. for 30 minutes. After that, metal Co was deposited on a transparent resin resist 10 by high-frequency sputtering such that it had an film thickness of 500 angstroms and metal Al was deposited on the metal Mo such that it had a film thickness of 2000 angstroms. The reflectance of the layer comprising metal Mo and metal Al was measured to find that the reflectance was 80% or more. This layer comprising metal Mo and metal Al corresponds to one example of the metal layer as described in the claims of this patent application.

The above metal Mo and metal Al were etched by a photoetching method using a phosphoric acid/acetic acid/nitric acid/water (volumetric ratio: 9:6:1:2)-based aqueous solution as an etching solution to form a pattern of a reflector electrode 11 as shown in FIG. 1. At this time, the reflector electrode 11 comprising metal Mo and metal Al was patterned such that the pattern of the source electrode 8 was electrically in contact with the pattern of the transmitting pixel electrode comprising the transparent conductive film 9 as shown in FIG. 1. At this time, the drain electrode 7 and source electrode 8 that contained metal Al were not eluted by the etching solution. The reflectance of this reflector electrode 11 was measured to find that it was 80% or more.

The TFT element which was a thin film transistor is constituted of the gate electrode 2, the α-Si:H(i) film 4, drain electrode 7, the source electrode 8 and the like in the α-SiTFT active matrix substrate 100 as shown in FIG. 1.

Also, this reflector electrode 11 corresponds to one example of the metal reflecting layer as described in the claims of the patent application and the phosphoric acid/acetic acid/oxalic acid/water (volumetric ratio: 9:6:1:2)-based aqueous solution as an etching solution corresponds to one example of the mixture acid containing phosphoric acid/acetic acid/nitric acid as described in the claims of the patent application.

After that, a SiN passivation film (not shown) and a shielding film pattern (not shown) were formed to produce an α-SiTFT active matrix substrate 100 as shown in FIG. 1. A liquid crystal layer was formed on this α-SiTFT active matrix substrate 100 to thereby produce a TFT-LCD system flat display. This α-SiTFT active matrix substrate 100 corresponds to one example of the semi-transmitting and semi-reflecting electrode substrate as described in the claims of the patent application and the TFT-LCD system flat display corresponds to one example of the liquid crystal display device as described in the claims of the patent application.

Embodiment B-2

An α-SiTFT active matrix substrate 100 in this embodiment B-2 has the same structure as that shown in FIG. 1 except only that the composition of the transparent conductive film 9 of the α-SiTFT active matrix substrate 100 in this embodiment B-2 is different from that of the above embodiment B-1. Therefore, the α-SiTFT active matrix substrate 100 of this embodiment B-2 will be explained also with reference to FIG. 1.

As shown in FIG. 1, metal Al was deposited on a transmittable glass substrate 1 by high-frequency sputtering such that it had an film thickness of 1500 angstroms and metal Mo was deposited on the metal Al such that it had a film thickness of 500 angstroms. It is to be noted that this glass substrate 1 corresponds to one example of the transparent substrate as described in the claims of the patent application.

Next, the above deposited metal Al and metal Mo were etched into the form shown in FIG. 1 according to a photoetching method using a phosphoric acid/acetic acid/nitric acid/water (volumetric ratio: 12:6:1:1)-based aqueous solution as an etching solution to form a gate electrode 2 and a gate electrode wiring 12.

Then, a silicon nitride film (hereinafter, referred to as a SiN film in some cases), which was to be a gate insulating film 3, was formed on the above glass substrate 1, the above gate electrode 2 and the above gate electrode wiring 12 by a glow discharge CVD method such that it had a film thickness of 3000 angstroms. In succession, an α-Si:H(i) film 4 was formed on the gate insulating film 3 such that it had a film thickness of 3500 angstroms. Moreover, a silicon nitride film (SiN film) which was to be a channel protective layer 5 was formed on the above α-Si:H(i) film 4 such that it had a film thickness of 3000 angstroms.

At this time, as the discharge gas, $SiH_4$—$NH_3$—$N_2$-based mixture gas was used for the gate insulating film 3 and channel protective layer 5 which were formed of a SiN film whereas $SiH_4$—$N_2$-based mixture gas was used for the α-Si:H(i) film 4. Also, the channel protective layer 5 made of a SiN film was etched into the form shown in FIG. 1 by dry etching using CHF-based gas.

In succession, an α-Si:H(n) film 6 was deposited on the above α-Si:H(i) film 4 and the above channel protective layer 5 by using $SiH_4$—$H_2$—$PH_3$-based mixture gas such that it had a film thickness of 3000 angstroms.

A three-layer film of metal Mo/metal Al/metal Mo was further deposited in this order on the deposited α-Si:H(n) 6 by a sputtering method such that the film thickness of the lower layer metal Mo was 0.05 μm, the film thickness of the metal Al was 0.2 μm and the film thickness of the upper layer metal Mo was 0.05 μm.

This metal Mo/Metal Al/metal Mo three-layer film was etched into the form shown in FIG. 1 by a photoetching method using a phosphoric acid/acetic acid/nitric acid/water (volumetric ratio: 9:8:1:2)-based aqueous solution to form a pattern of a drain electrode 7 and a pattern of source electrode 8. Moreover, dry etching using CHF-based gas and wet etching using a hydrazine ($NH_2NH_2 \cdot H_2O$)-based aqueous solution were combined to etch the α-Si:H(i) film 4 and α-Si:H(n) film 6 formed of an α-Si:H film, thereby forming a pattern of α-Si:H(i) film 4 and a pattern of the α-Si:H(n) film 6 having the forms shown in FIG. 1. Also, as shown in FIG. 1, a transparent resin resist 10 was used to form a protective film, thereby forming a pattern of a through-hole 10*a* and the like.

Transparent Conductive Film Containing Holmium Oxide

An amorphous transparent conductive film 9 containing indium oxide as its major component and holmium oxide was deposited on this gate insulating film 3 by a sputtering method. The target used in this sputtering method was an $In_2O_3$—$Ho_2O_3$ sintered body that was adjusted such that $[In_2O_3]/([In_2O_3]+[Ho_2O_3])$ showing the weight ratio of $In_2O_3$ to $Ho_2O_3$ in the target became 0.97. Here, $[In_2O_3]$ represents the weight of indium oxide per unit volume in the transparent conductive film 9 and $[Ho_2O_3]$ represents the weight of holmium oxide per unit volume in the transparent conductive film 9.

In the sputtering, this $In_2O_3$—$Ho_2O_3$ sintered body was placed and used as the cathode in a planer magnetron type to deposit the transparent conductive film 9 such that the film thickness was 1000 angstroms. At this time, as the discharge gas in the sputtering, pure argon gas or argon gas mixed with $O_2$ gas contained in a trace amount of the order of about 1 vol % was used. This transparent conductive film 9 corresponds to one example of the transparent conductive layer as described in the claim of the patent application.

As to the form of the above holmium element in the target, it may be dispersed in the form of holmium oxide such as $Ho_2O_3$ or in the form of a complex oxide between indium oxide and holmium oxide such as $HoInO_3$, $(Ho_{0.5}In_{0.5})_2O_3$ or the like in the indium oxide sintered body. A preferable form of holmium is as follows: a holmium atom is substituted for the indium site of indium oxide whereby it is dispersed as a solid solution at an atomic level in the indium oxide sintered body. It is rather effective that holmium is dispersed at an atomic level in the indium oxide sintered body in this manner to stabilize the discharging in sputtering, thereby obtaining the transparent conductive film 9 having a low resistance.

The transparent conductive film 9 which was an $In_2O_3$—$Ho_2O_3$ film formed by the above sputtering was analyzed by an X-ray diffraction method, to find that no peak was observed, showing this film to be amorphous. It was also found that the specific resistance of the transparent conductive film 9 that was the $In_2O_3$—$Ho_2O_3$ film was about $5.4 \times 10^{-4}$ Ω·cm and was therefore a film used satisfactorily as an electrode. This transparent conductive film 9, which was the In2O3-Ho2O3 film, was etched by a photoetching method using an 3.2 wt % aqueous oxalic acid solution as an etchant so as to form a pattern of a transmitting pixel electrode. A pattern of a transmitting pixel electrode made of an amorphous electrode of the transparent conductive film 9 shown in FIG. 1 was formed. It is to be noted that this 3.2 wt % aqueous oxalic acid solution corresponds to one example of the etchant containing oxalic acid as described in the claims of the patent application.

Then, the substrate formed with the above transparent conductive film 9 was heat-treated at 250° C. for 30 minutes. After that, metal Co was deposited on the substrate by high-frequency sputtering such that it had an film thickness of 500 angstroms and metal Al was deposited on the metal Mo such that it had a film thickness of 2000 angstroms. The reflectance of the layer comprising metal Mo and metal Al was measured to find that the reflectance was 80% or more. This layer comprising metal Mo and metal Al corresponds to one example of the metal layer as described in the claims of this patent application.

The above metal Mo and metal Al were etched by a photoetching method using a phosphoric acid/acetic acid/nitric acid/water (volumetric ratio: 9:6:1:2)-based aqueous solution as an etching solution to form a pattern of a reflector electrode 11 as shown in FIG. 1. At this time, the reflector electrode 11 constituted of metal Mo and metal Al was patterned such that the pattern of the source electrode 8 was electrically in contact with the pattern of the transmitting pixel electrode comprising the transparent conductive film 9 as shown in FIG. 1. At this time, the drain electrode 7 and source electrode 8 that contained metal Al were not eluted by the etching solution. The reflectance of this reflector electrode 11 was measured to find that it was 80% or more.

The TFT element which was a thin film transistor is constituted of the gate electrode 2, the α-Si:H(i) film 4, drain electrode 7, the source electrode 8 and the like in the α-SiTFT active matrix substrate 100 as shown in FIG. 1.

This reflector electrode 11 corresponds to one example of the metal reflecting layer as described in the claims of the patent application and the phosphoric acid/acetic acid/oxalic acid/water (volumetric ratio: 9:6:1:2)-based aqueous solution as an etching solution corresponds to one example of the mixture acid of phosphoric acid/acetic acid/nitric acid as described in the claims of the patent application.

After that, a SiN passivation film (not shown) and a shielding film pattern (not shown) were formed to produce an α-SiTFT active matrix substrate 100 as shown in FIG. 1. A liquid crystal layer was formed on this α-SiTFT active matrix substrate 100 to thereby produce a TFT-LCD system flat display. This α-SiTFT active matrix substrate 100 corresponds to one example of the semi-transmitting and semi-reflecting electrode substrate as described in the claims of the patent application and the TFT-LCD system flat display corresponds to one example of the liquid crystal display device as described in the claims of the patent application.

Embodiment B-3

An α-SiTFT active matrix substrate 100 in this embodiment 3 has the same structure as that shown in FIG. 1 except only that the composition of the transparent conductive film 9 of the α-SiTFT active matrix substrate 100 in this embodiment B-3 is different from that of the above embodiment 1 or 2. Therefore, the α-SiTFT active matrix substrate 100 of this embodiment 3 will be explained also with reference to FIG. 1.

As shown in FIG. 1, metal Al was deposited on a transmittable glass substrate 1 by high-frequency sputtering such that it had an film thickness of 1500 angstroms and metal Mo was deposited on the metal Al such that it had a film thickness of 500 angstroms. This glass substrate 1 corresponds to one example of the transparent substrate as described in the claims of the patent application.

Next, the above deposited metal Al and metal Mo were etched into the form shown in FIG. 1 according to a photoetching method using a phosphoric acid/acetic acid/nitric acid/water (volumetric ratio: 12:6:1:1)-based aqueous solution as an etching solution to form a gate electrode 2 and a gate electrode wiring 12.

Then, a silicon nitride film (hereinafter, referred to as a SiN film in some cases), which was to be a gate insulating film 3, was formed on the above glass substrate 1, the above gate electrode 2 and the above gate electrode wiring 12 by a glow discharge CVD method such that it had a film thickness of 3000 angstroms. In succession, an α-Si:H(i) film 4 was formed on the gate insulating film 3 such that it had a film thickness of 3500 angstroms. Moreover, a silicon nitride film (SiN film) which was to be a channel protective layer 5 was formed on the above α-Si:H(i) film 4 such that it had a film thickness of 3000 angstroms.

At this time, as the discharge gas, $SiH_4$—$NH_3$—$N_2$-based mixture gas was used for the gate insulating film 3 and channel protective layer 5 which were formed of a SiN film whereas $SiH_4$—$N_2$-based mixture gas was used for the α-Si:H(i) film 4. Also, the channel protective layer 5 formed of a SiN film was etched into the form shown in FIG. 1 by dry etching using CHF-based gas.

In succession, an α-Si:H(n) film 6 was deposited on the above α-Si:H(i) film 4 and the above channel protective layer 5 by using $SiH_4$—$H_2$—$PH_3$-based mixture gas such that it had a film thickness of 3000 angstroms.

A three-layer film of metal Mo/metal Al/metal Mo was further deposited in this order on the deposited α-Si:H(n) 6 by a sputtering method such that the film thickness of the lower layer metal Mo was 0.05 μm, the film thickness of the metal Al was 0.2 μm and the film thickness of the upper layer metal Mo was 0.051 μm.

This metal Mo/Metal Al/metal Mo three-layer film was etched into the form shown in FIG. 1 by a photoetching method using a phosphoric acid/acetic acid/nitric acid/water (volumetric ratio: 9:8:1:2)-based aqueous solution to form a pattern of a drain electrode 7 and a pattern of source electrode 8. Moreover, dry etching using CHF-based gas and wet etching using a hydrazine ($NH_2NH_2.H_2O$)-based aqueous solution were combined to etch the α-Si:H(i) film 4 and the α-Si:H(n) film 6 formed of an α-Si:H film, thereby forming a pattern of α-Si:H(i) film 4 and a pattern of the α-Si:H(n) film 6 having the forms shown in FIG. 1. Also, as shown in FIG. 1, a transparent resin resist 10 was used to form a protective film, thereby forming a pattern of a through-hole 10a and the like.

Transparent Conductive Film Containing Gadolinium Oxide

An amorphous transparent conductive film 9 containing indium oxide as its major component and gadolinium oxide was deposited on this gate insulating film 3 by a sputtering method. The target used in this sputtering method was an $In_2O_3$—$Gd_2O_3$ sintered body that was adjusted such that $[In_2O_3]/([In_2O_3]+[Gd_2O_3])$ showing the weight ratio of $In_2O_3$ to $Gd_2O_3$ in the target became 0.97. Here, $[In_2O_3]$ represents the weight of indium oxide per unit volume in the transparent conductive film 9 and $[Gd_2O_3]$ represents the weight of gadolinium oxide per unit volume in the transparent conductive film 9.

In the sputtering, this $In_2O_3$—$Gd_2O_3$ sintered body was placed and used as the cathode in a planer magnetron type to deposit the transparent conductive film 9 such that the film thickness was 1000 angstroms. At this time, as the discharge gas in the sputtering, pure argon gas or argon gas mixed with $O_2$ gas contained in a trace amount of the order of about 1 vol % was used. This transparent conductive film 9 corresponds to one example of the transparent conductive layer as described in the claim of the patent application.

As to the form of the gadolinium element in the target, it may be dispersed in the form of gadolinium oxide such as $Gd_2O_3$ or in the form of a complex oxide between indium oxide and gadolinium oxide such as $GdInO_3$ in the indium oxide sintered body. A preferable form of gadolinium is as follows: a gadolinium atom is substituted for the indium site of indium oxide whereby it is dispersed as a solid solution at an atomic level in the indium oxide sintered body. It is rather effective that gadolinium is dispersed at an atomic level in the indium oxide sintered body in this manner to stabilize the discharging in sputtering, thereby obtaining the transparent conductive film 9 having a low resistance.

The transparent conductive film 9 which was an $In_2O_3$—$Gd_2O_3$ film formed by the above sputtering was analyzed by an X-ray diffraction method, to find that no peak was observed, showing this film to be amorphous. It was also found that the specific resistance of the transparent conductive film 9 that was the $In_2O_3$—$Gd_2O_3$ film was about 7.4× $10^{-4}$ Ω·cm and was therefore a film used satisfactorily as an electrode.

This transparent conductive film 9, which was the In2O3-Gd2O3 film, was etched by a photoetching method using an 3.2 wt % aqueous oxalic acid solution as an etchant so as to form a pattern of a transmitting pixel electrode. A pattern of a transmitting pixel electrode made of an amorphous electrode of the transparent conductive film 9 shown in FIG. 1 was formed. It is to be noted that this 3.2 wt % aqueous oxalic acid solution corresponds to one example of the etchant containing oxalic acid as described in the claims of the patent application.

Next, the substrate on which the above transparent conductive layer 9 was formed was heat-treated at 250° C. for 30 minutes. Then, metal Co was deposited on a transparent resin resist 10 by high-frequency sputtering such that it had an film thickness of 500 angstroms and metal Al was deposited on the metal Mo such that it had a film thickness of 2000 angstroms. The reflectance of the layer comprising metal Mo and metal Al was measured to find that the reflectance was 80% or more. This layer comprising metal Mo and metal Al corresponds to one example of the layer as described in the claims of this patent application.

The above metal Mo and metal Al were etched by a photoetching method using a phosphoric acid/acetic acid/nitric acid/water (volumetric ratio: 9:6:1:2)-based aqueous solution as an etching solution to form a pattern of a reflector electrode 11 as shown in FIG. 1. At this time, the reflector electrode 11 was patterned such that the pattern of the source electrode 8 was electrically in contact with the pattern of the transmitting pixel electrode comprising the transparent conductive film 9 as shown in FIG. 1. At this time, the drain electrode 7 and source electrode 8 that contained metal Al were not eluted by the etching solution. The reflectance of this reflector electrode 11 was measured to find that it was 80% or more.

The TFT element which was a thin film transistor is constituted of the gate electrode 2, the α-Si:H(i) film 4, drain electrode 7, the source electrode 8 and the like in the α-SiTFT active matrix substrate 100 as shown in FIG. 1.

This reflector electrode 11 corresponds to one example of the metal reflecting layer as described in the claims of the patent application and the phosphoric acid/acetic acid/oxalic acid/water (volumetric ratio: 9:6:1:2)-based aqueous solution corresponds to one example of the mixture acid constituted of phosphoric acid/acetic acid/nitric acid as described in the claims of the patent application.

After that, a SiN passivation film (not shown) and a shielding film pattern (not shown) were formed to produce an α-SiTFT active matrix substrate 100 as shown in FIG. 1. A liquid crystal layer was formed on this α-SiTFT active matrix substrate 100 to thereby produce a TFT-LCD system flat display. Like the above embodiments 1 and 2, this α-SiTFT active matrix substrate 100 corresponds to one example of the semi-transmitting and semi-reflecting electrode substrate as described in the claims of the patent application and the TFT-LCD system flat display corresponds to one example of the liquid crystal display device as described in the claims of the patent application.

Embodiment B-4

An α-SiTFT active matrix substrate 100 in this embodiment B-4 has the same structure as that shown in FIG. 1 except only that the composition of the transparent conductive film 9 of the α-SiTFT active matrix substrate 100 in this embodiment B-4 is different from that of the above embodiment B-1, B-2 or B-3. Therefore, the α-SiTFT active matrix substrate 100 of this embodiment B-4 will be explained also with reference to FIG. 1.

As shown in FIG. 1, metal Al was deposited on a transmittable glass substrate 1 by high-frequency sputtering such that it had an film thickness of 1500 angstroms and metal Mo was deposited on the metal Al such that it had a film thickness of 500 angstroms. This glass substrate 1 corresponds to one example of the transparent substrate as described in the claims of the patent application.

Next, the above deposited metal Al and metal Mo were etched into the form shown in FIG. 1 according to a photoetching method using a phosphoric acid/acetic acid/nitric acid/water (volumetric ratio: 12:6:1:1)-based aqueous solution as an etching solution to form a gate electrode 2 and a gate electrode wiring 12.

Then, a silicon nitride film (hereinafter, referred to as a SiN film in some cases), which was to be a gate insulating film 3, was deposited on the above glass substrate 1, the above gate electrode 2 and the above gate electrode wiring 12 by a glow discharge CVD method such that it had a film thickness of 3000 angstroms. In succession, an α-Si:H(i) film 4 was deposited on the gate insulating film 3 such that it had a film thickness of 3500 angstroms. Moreover, a silicon nitride film (SiN film) which was to be a channel protective layer 5 was deposited on the above α-Si:H(i) film 4 such that it had a film thickness of 3000 angstroms.

At this time, as the discharge gas, $SiH_4$—$NH_3$—$N_2$-based mixture gas was used for the gate insulating film 3 and channel protective layer 5 which were formed of a SiN film whereas $SiH_4$—$N_2$-based mixture gas was used for the α-Si:H(i) film 4. Also, the channel protective layer 5 formed of a SiN film was etched into the form shown in FIG. 1 by dry etching using CHF-based gas.

In succession, an α-Si:H(n) film 6 was deposited on the above α-Si:H(i) film 4 and the above channel protective layer 5 by using $SiH_4$—$H_2$—$PH_3$-based mixture gas such that it had a film thickness of 3000 angstroms.

A three-layer film of metal Mo/metal Al/metal Mo was further deposited in this order on the deposited α-Si:H(n) 6 by a sputtering method such that the film thickness of the lower layer metal Mo was 0.05 μm, the film thickness of the metal Al was 0.2 μm and the film thickness of the upper layer metal Mo was 0.051 μm.

This metal Mo/Metal Al/metal Mo three-layer film was etched into the form shown in FIG. 1 by a photoetching method using a phosphoric acid/acetic acid/nitric acid/water (volumetric ratio: 9:8:1:2)-based aqueous solution to form a pattern of a drain electrode 7 and a pattern of source electrode 8. Moreover, dry etching using CHF-based gas and wet etching using a hydrazine ($NH_2NH_2.H_2O$)-based aqueous solution were combined to etch the α-Si:H(i) film 4 and α-Si:H(n) film 6 formed of an α-Si:H film, thereby forming a pattern of α-Si:H(i) film 4 and a pattern of the α-Si:H(n) film 6. Also, as shown in FIG. 1, a transparent resin resist 10 was used to form a protective film, thereby forming a pattern of a through-hole 10a and the like.

Transparent Conductive Film Containing Erbium Oxide

An amorphous transparent conductive film 9 containing indium oxide as its major component and erbium oxide was deposited on this gate insulating film 3 by a sputtering method. The target used in this sputtering method was an $In_2O_3$—$Er_2O_3$ sintered body that was adjusted such that $[In_2O_3]/([In_2O_3]+[Er_2O_3])$ showing the weight ratio of $In_2O_3$ to $Er_2O_3$ in the target became 0.97. Here, $[In_2O_3]$ represents the weight of indium oxide per unit volume in the transparent conductive film 9 and $[Er_2O_3]$ represents the weight of erbium oxide per unit volume in the transparent conductive film 9.

In the sputtering, this $In_2O_3$—$Er_2O_3$ sintered body was placed and used as the cathode in a planer magnetron type to deposit the transparent conductive film 9 such that the film thickness was 1000 angstroms. At this time, as the discharge gas in the sputtering, pure argon gas or argon gas mixed with $O_2$ gas contained in a trace amount of the order of about 1 vol % was used. This transparent conductive film 9 corresponds to one example of the transparent conductive layer as described in the claim of the patent application.

As to the form of the erbium element contained in the target, it may be dispersed in the form of erbium oxide such as $Er_2O_3$ or in the form of a complex oxide between indium oxide and erbium oxide such as $(Er_{0.5}In_{0.5})_2O_3$ in the indium oxide sintered body. A preferable form of erbium is as follows: an erbium atom is substituted for the indium site of indium oxide whereby it is dispersed as a solid solution at an atomic level in the indium oxide sintered body. It is rather effective that erbium is dispersed at an atomic level in the indium oxide sintered body in this manner to stabilize the discharging in sputtering, thereby obtaining the transparent conductive film 9 having a low resistance.

The transparent conductive film 9 which was an $In_2O_3$—$Er_2O_3$ film formed by the above sputtering was analyzed by an X-ray diffraction method, to find that no peak was observed, showing this film to be amorphous. It was also found that the specific resistance of the transparent conductive film 9 that was the $In_2O_3$—$Er_2O_3$ film was about $8.0 \times 10^{-4}$ Ω·cm and was therefore a film used satisfactorily as an electrode.

This transparent conductive film 9, which was the In2O3-Er2O3 film, was etched by a photoetching method using an 3.2 wt % aqueous oxalic acid solution as an etchant so as to form a pattern of a transmitting pixel electrode. A pattern of a transmitting pixel electrode made of an amorphous electrode of the transparent conductive film 9 shown in FIG. 1 was formed. It is to be noted that this 3.2 wt % aqueous oxalic acid solution corresponds to one example of the etchant containing oxalic acid as described in the claims of the patent application.

Next, the substrate on which the above transparent conductive layer 9 was formed was heat-treated at 250° C. for 30 minutes. Then, metal Co was deposited on a transparent resin resist 10 by high-frequency sputtering such that it had an film thickness of 500 angstroms and metal Al was deposited on the metal Mo such that it had a film thickness of 2000 angstroms. The reflectance of the layer comprising metal Mo and metal Al was measured to find that the reflectance was 80% or more. This layer comprising metal Mo and metal Al corresponds to one example of the metal layer as described in the claims of this patent application.

The above metal Mo and metal Al were etched by a photoetching method using a phosphoric acid/acetic acid/nitric acid/water (volumetric ratio: 9:6:1:2)-based aqueous solution as an etching solution to form a pattern of a reflector electrode 11 as shown in FIG. 1. At this time, the reflector electrode 11 constituted of metal Mo and metal Al was patterned such that the pattern of the source electrode 8 was electrically in contact with the pattern of the transmitting pixel electrode comprising the transparent conductive film 9 as shown in FIG. 1. At this time, the drain electrode 7 and source electrode 8 that contained metal Al were not eluted by the etching solution. The reflectance of this reflector electrode 11 was measured to find that it was 80% or more.

The TFT element which was a thin film transistor is constituted of the gate electrode 2, the α-Si:H(i) film 4, drain electrode 7, the source electrode 8 and the like in the α-SiTFT active matrix substrate 100.

This reflector electrode 11 corresponds to one example of the metal reflecting layer as described in the claims of the patent application and the phosphoric acid/acetic acid/oxalic acid/water (volumetric ratio: 9:6:1:2)-based aqueous solution corresponds to one example of the mixture acid constituted of phosphoric acid/acetic acid/nitric acid as described in the claims of the patent application.

After that, a SiN passivation film (not shown) and a shielding film pattern (not shown) were formed to produce an α-SiTFT active matrix substrate 100 as shown in FIG. 1. A liquid crystal layer was formed on this α-SiTFT active matrix substrate 100 to thereby produce a TFT-LCD system flat display. Like the above embodiments 1 to 3, this α-SiTFT active matrix substrate 100 corresponds to one example of the semi-transmitting and semi-reflecting electrode substrate as described in the claims of the patent application and the TFT-LCD system flat display device corresponds to one example of the liquid crystal display device as described in the claims of the patent application.

Embodiment B-5

An α-SiTFT active matrix substrate 100 in this embodiment B-5 has the same structure as that shown in FIG. 1 except only that the composition of the transparent conductive film 9 of the α-SiTFT active matrix substrate 100 in this embodiment B-5 is different from that of the above embodiment B-1, B-2, B-3 or B-4. Therefore, the α-SiTFT active matrix substrate 100 of this embodiment B-5 will be explained also with reference to FIG. 1.

As shown in FIG. 1, metal Al was deposited on a transmittable glass substrate 1 by high-frequency sputtering such that it had an film thickness of 1500 angstroms and metal Mo was deposited on the metal Al such that it had a film thickness of 500 angstroms. This glass substrate 1 corresponds to one example of the transparent substrate as described in the claims of the patent application.

Next, the above deposited metal Al and metal Mo were etched into the form shown in FIG. 1 according to a photoetching method using a phosphoric acid/acetic acid/nitric acid/water (volumetric ratio: 12:6:1:1)-based aqueous solution as an etching solution to form a gate electrode 2 and a gate electrode wiring 12.

Then, a silicon nitride film (hereinafter, referred to as a SiN film in some cases), which was to be a gate insulating film 3, was formed on the above glass substrate 1, the above gate electrode 2 and the above gate electrode wiring 12 by a glow discharge CVD method such that it had a film thickness of 3000 angstroms. In succession, an α-Si:H(i) film 4 was formed on the gate insulating film 3 such that it had a film thickness of 3500 angstroms. Moreover, a silicon nitride film (SiN film) which was to be a channel protective layer 5 was formed on the above α-Si:H(i) film 4 such that it had a film thickness of 3000 angstroms.

At this time, as the discharge gas, $SiH_4$—$NH_3$—$N_2$-based mixture gas was used for the gate insulating film 3 and channel protective layer 5 which were formed of a SiN film whereas $SiH_4$—$N_2$-based mixture gas was used for the α-Si:H(i) film 4. Also, the channel protective layer 5 formed of a SiN film was etched into the form shown in FIG. 1 by dry etching using CHF-based gas.

In succession, an α-Si:H(n) film 6 was deposited on the above α-Si:H(i) film 4 and the above channel protective layer 5 by using $SiH_4$—$H_2$—$PH_3$-based mixture gas such that it had a film thickness of 3000 angstroms.

A three-layer film of metal Mo/metal Al/metal Mo was further deposited in this order on the deposited α-Si:H(n) 6 by a sputtering method such that the film thickness of the lower layer metal Mo was 0.05 μm, the film thickness of the metal Al was 0.21 μm and the film thickness of the upper layer metal Mo was 0.05 μm.

This metal Mo/Metal Al/metal Mo three-layer film was etched into the form shown in FIG. 1 by a photoetching method using a phosphoric acid/acetic acid/nitric acid/water (volumetric ratio: 9:8:1:2)-based aqueous solution to form a pattern of a drain electrode 7 and a pattern of source electrode 8. Moreover, dry etching using CHF-based gas and wet etching using a hydrazine ($NH_2NH_2.H_2O$)-based aqueous solution were combined to etch the α-Si:H(i) film 4 and α-Si:H(n) film 6 formed of an α-Si:H film, thereby forming a pattern of α-Si:H(i) film 4 and a pattern of the α-Si:H(n) film 6. Also, as shown in FIG. 1, a transparent resin resist 10 was used to form a protective film, thereby forming a pattern of a through-hole 10a and the like.

Transparent Conductive Film Containing Cerium Oxide

An amorphous transparent conductive film 9 containing indium oxide as its major component and cerium oxide was deposited on this gate insulating film 3 by a sputtering method. The target used in this sputtering method was an $In_2O_3$—$CeO_2$ sintered body that was adjusted such that $[In_2O_3]/([In_2O_3]+[CeO_2])$ showing the weight ratio of $In_2O_3$ to $CeO_2$ in the target became 0.97. Here, $[In_2O_3]$ represents the weight of indium oxide per unit volume in the transparent conductive film 9 and $[CeO_2]$ represents the weight of cerium oxide per unit volume in the transparent conductive film 9.

In the sputtering, this $In_2O_3$—$CeO_2$ sintered body was placed and used as the cathode in a planer magnetron type to deposit the transparent conductive film 9 such that the film thickness was 1000 angstroms. At this time, as the discharge gas in the sputtering, pure argon gas or argon gas mixed with $O_2$ gas contained in a trace amount of the order of about 1 vol % was used. This transparent conductive film 9 corresponds to one example of the transparent conductive layer as described in the claim of the patent application.

As to the form of the cerium element in the target, it may be dispersed in the form of cerium oxide such as CeO, $CeO_2$ or $Ce_2O_3$ in the indium oxide sintered body. A preferable form of cerium is as follows: a cerium atom is substituted for the indium site of indium oxide whereby it is dispersed as a solid solution at an atomic level in the indium oxide sintered body. It is rather effective that cerium is dispersed at an atomic level in the indium oxide sintered body in this manner to stabilize the discharging in sputtering, thereby obtaining the transparent conductive film 9 having a low resistance.

The transparent conductive film 9 which was an $In_2O_3$—$CeO_2$ film formed by the above sputtering was analyzed by an X-ray diffraction method, to find that no peak was observed, showing this film to be amorphous. It was also found that the specific resistance of the transparent conductive film 9 that was the $In_2O_3$—$CeO_2$ film was about $5.5 \times 10^{-4}$ Ω·cm and was therefore a film used satisfactorily as an electrode.

This transparent conductive film 9, which was the In2O3-CeO2 film, was etched by a photoetching method using an 3.2 wt % aqueous oxalic acid solution as an etchant so as to form a pattern of a transmitting pixel electrode. A pattern of a transmitting pixel electrode made of an amorphous electrode of the transparent conductive film 9 shown in FIG. 1 was thus formed. It is to be noted that this 3.2 wt % aqueous oxalic acid solution corresponds to one example of the etchant containing oxalic acid as described in the claims of the patent application.

Next, the substrate on which the above transparent conductive layer 9 was formed was heat-treated at 250° C. for 30 minutes. Then, metal Co was deposited on a transparent resin resist 10 by high-frequency sputtering such that it had an film thickness of 500 angstroms and metal Al was deposited on the metal Mo such that it had a film thickness of 2000 angstroms. The reflectance of the layer comprising metal Mo and metal Al was measured to find that the reflectance was 80% or more. This layer comprising metal Mo and metal Al corresponds to one example of the metal layer as described in the claims of this patent application.

The above metal Mo and metal Al were etched by a photoetching method using a phosphoric acid/acetic acid/nitric acid/water (volumetric ratio: 9:6:1:2)-based aqueous solution as an etching solution to form a pattern of a reflector electrode 11 as shown in FIG. 1. At this time, the reflector electrode 11 constituted of metal Mo and metal Al was patterned such that the pattern of the source electrode 8 was electrically in contact with the pattern of the transmitting pixel electrode comprising the transparent conductive film 9 as shown in FIG. 1. At this time, the drain electrode 7 and source electrode 8 that contained metal Al were not eluted by the etching solution. The reflectance of this reflector electrode 11 was measured to find that it was 80% or more.

The TFT element which was a thin film transistor is constituted of the gate electrode 2, the α-Si:H(i) film 4, drain electrode 7, the source electrode 8 and the like in the α-SiTFT active matrix substrate 100.

This reflector electrode 11 corresponds to one example of the metal reflecting layer as described in the claims of the patent application and the phosphoric acid/acetic acid/oxalic acid/water (volumetric ratio: 9:6:1:2)-based aqueous solution corresponds to one example of the mixture acid constituted of phosphoric acid/acetic acid/nitric acid as described in the claims of the patent application.

After that, a SiN passivation film (not shown) and a shielding film pattern (not shown) were formed to produce an α-SiTFT active matrix substrate 100 as shown in FIG. 1. A liquid crystal layer was formed on this α-SiTFT active matrix substrate 100 to thereby produce a TFT-LCD system flat display. Like the above embodiments 1 to 4, this α-SiTFT active matrix substrate 100 corresponds to one example of the semi-transmitting and semi-reflecting electrode substrate as described in the claims of the patent application and the TFT-LCD system flat display corresponds to one example of the liquid crystal display device as described in the claims of the patent application.

Embodiment B-6

In the aforementioned embodiments B-1 to B-5, examples in which the transparent conductive film 9 contains indium oxide as its major component and a lanthanoid-based metal oxide such as dysprosium oxide, holmium oxide, gadolinium oxide, erbium oxide or cerium oxide are shown. It is however preferable that the above transparent conductive film 9 contain lanthanum oxide or samarium oxide in place of the above lanthanoid-based metal oxide. When the transparent conductive film 9 contains lanthanum oxide or samarium oxide in this manner, the transparent conductive film 9 of this embodiment B-6 produces the same action effect as each transparent conductive film 9 obtained in the above embodiments B-1 to B-5.

Embodiment B-7

In the above embodiments B-1 to B-5, examples are shown in which the reflector electrode 11 is constituted of a metal Mo layer and a metal Al layer. However, the reflector electrode 11 used in this embodiment is preferably constituted of a metal Ag layer in place of the above metal Al layer. Specifically, the reflector electrode 11 of this embodiment is also preferably constituted of a metal Mo and a metal Ag. When a metal Ag layer is contained in place of a metal Al, the reflector electrode 11 of the embodiment B-7 also produces the same action effect as the reflector electrode 11 of each of the above embodiments B-1 to B-5 as mentioned above.

What is claimed is:

1. A semi-transmitting and semi-reflecting electrode substrate comprising:
   a transparent substrate;
   a transparent conductive layer which is disposed on said transparent substrate and contains indium oxide as its major component and further one or two or more oxides selected from tungsten oxide, molybdenum oxide and niobium oxide; and
   a metal reflecting layer which is disposed on said transparent substrate, reflects extraneous light and is connected electrically with said transparent conductive layer,
   wherein the value of [In]/[All metals] that is a composition ratio of In in said transparent conductive layer containing indium oxide as its major component and further one or two or more oxides selected from tungsten oxide, molybdenum oxide and niobium oxide is 0.85 to 0.99.

2. The semi-transmitting and semi-reflecting electrode substrate according to claim 1, wherein said metal reflecting layer has a layer containing Al or Ag as its components.

3. A semi-transmitting and semi-reflecting electrode substrate comprising:
   a transparent substrate;
   a transparent conductive layer which is disposed on said transparent substrate and contains indium oxide as its major component and further one or two or more oxides selected from tungsten oxide, molybdenum oxide and niobium oxide;
   a TFT element disposed on said transparent substrate: and
   a metal layer which is disposed on said transparent substrate and connects said transparent conductive layer electrically with said TFT element;
   wherein:
   said metal layer has a reflectance of 80% or more,
   wherein the value of [In]/[All metals] that is a composition ratio of In in said transparent conductive layer containing indium oxide as its major component and further one or two or more oxides selected from tungsten oxide, molybdenum oxide and niobium oxide is 0.85 to 0.99.

4. The semi-transmitting and semi-reflecting electrode substrate according to claim 3, wherein said metal layer having a reflectance of 80% or more has a layer containing Al or Ag as its components.

5. A method of producing the semi-transmitting and semi-reflecting electrode substrate according to claim 1, the method comprising:
   a step of etching the above transparent conductive layer which contains indium oxide as its major component and further one or two or more oxides selected from tungsten oxide, molybdenum oxide and niobium oxide and is disposed on said transparent substrate, by an etchant containing oxalic acid; and
   a step of etching the metal layer connected electrically with said transparent electrode layer by a mixture acid containing phosphoric acid, acetic acid and nitric acid to form said metal reflecting layer.

6. A method of producing the semi-transmitting and semi-reflecting electrode substrate according to claim 3, the method comprising:
   a step of etching said transparent conductive layer which contains indium oxide as its major component and further one or two or more oxides selected from tungsten oxide, molybdenum oxide and niobium oxide and is disposed on said transparent substrate, by an etchant containing oxalic acid; and
   a step of etching said metal layer which connects the said transparent conductive layer electrically with said TFT element and has a reflectance of 80% or more, by using a mixture acid containing phosphoric acid, oxalic acid and nitric acid.

7. A liquid crystal display comprising:
   the semi-transmitting and semi-reflecting electrode substrate according to claim 1; and
   a liquid crystal layer driven by said semi-transmitting and semi-reflecting electrode substrate.

8. A semi-transmitting and semi-reflecting electrode substrate comprising:
   a transparent substrate;
   a transparent conductive layer which is disposed on said transparent substrate and contains indium oxide as its major component and further one or two or more oxides selected from lanthanoid-based metal oxides; and
   a metal reflecting layer which is disposed on said transparent substrate and is connected electrically with said transparent conductive layer,
   wherein the value of [In]/[All metals] that is a composition ratio of In in said transparent conductive layer containing indium oxide as its major component and further one or two or more oxides selected from lanthanoid-based metal oxides is 0.8 to 0.99.

9. The semi-transmitting and semi-reflecting electrode substrate according to claim 8, wherein said metal reflecting layer has a layer containing Al or Ag as its major components.

10. The semi-transmitting and semi-reflecting electrode substrate according to claim 8, wherein said lanthanoid-based metal oxide is lanthanum oxide, cerium oxide, samarium oxide, gadolinium oxide, dysprosium oxide, erbium oxide or holmium oxide.

11. A semi-transmitting and semi-reflecting electrode substrate comprising:
   a transparent substrate;
   a transparent conductive layer which is disposed on said transparent substrate and contains indium oxide as its major component and further one or two or more oxides selected from lanthanoid-based metal oxides;
   a TFT element disposed on said transparent substrate; and
   a metal layer which is disposed on said transparent substrate and connects said transparent conductive layer electrically with said TFT element;
   wherein:
   said metal layer has a reflectance of 80% or more,
   wherein the value of [In]/[All metals] that is a composition ratio of In in said transparent conductive layer containing indium oxide as its major component and further one or two or more oxides selected from lanthanoid-based metal oxides is 0.8 to 0.99.

12. The semi-transmitting and semi-reflecting electrode substrate according to claim 11, wherein said metal layer having a reflectance of 80% or more has a layer containing Al or Ag as its major components.

13. The semi-transmitting and semi-reflecting electrode substrate according to claim 11, wherein said lanthanoid-based metal oxide is lanthanum oxide, cerium oxide, samarium oxide, gadolinium oxide, dysprosium oxide, erbium oxide or holmium oxide.

14. A method of producing the semi-transmitting and semi-reflecting electrode substrate according to claim 8, the method comprising:
   a step of etching the above transparent conductive layer which contains indium oxide as its major component and further one or two or more oxides selected from lanthanoid-based metal oxides and is disposed on said transparent substrate, by an etchant containing oxalic acid; and a step of etching the metal layer connected electrically with said transparent electrode layer by a mixture acid containing phosphoric acid, acetic acid and nitric acid to form said metal reflecting layer.

15. A method of producing the semi-transmitting and semi-reflecting electrode substrate according to claim 11, the method comprising:

a step of etching said transparent conductive layer which contains indium oxide as its major component and further containing one or two or more oxides selected from lanthanoid-based metal oxides and is disposed on said transparent substrate, by an etchant containing oxalic acid; and a step of etching the metal layer having a reflectance of 80% or more which connects said transparent electrode layer electrically with a TFT element, by a mixture acid containing phosphoric acid, acetic acid and nitric acid.

16. The method of producing a semi-transmitting and semi-reflecting electrode substrate according to claim 14, wherein said lanthanoid-based metal oxide is lanthanum oxide, cerium oxide, samarium oxide, gadolinium oxide, dysprosium oxide, erbium oxide or holmium oxide.

17. A liquid crystal display device comprising:

the semi-transmitting and semi-reflecting electrode substrate according to claim 8; and a liquid crystal layer driven by said semi-transmitting and semi-reflecting electrode substrate.

* * * * *